US012795236B2

(12) United States Patent
Shi et al.

(10) Patent No.: US 12,795,236 B2
(45) Date of Patent: Nov. 10, 2026

(54) ENHANCED VIDEO STABILIZATION BASED ON MACHINE LEARNING MODELS

(71) Applicant: GOOGLE LLC, Mountain View, CA (US)

(72) Inventors: Fuhao Shi, San Jose, CA (US); Zhenmei Shi, Madison, WI (US); Wei-Sheng Lai, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 302 days.

(21) Appl. No.: 18/256,587

(22) PCT Filed: Dec. 10, 2020

(86) PCT No.: PCT/US2020/064166

§ 371 (c)(1),
(2) Date: Jun. 8, 2023

(87) PCT Pub. No.: WO2022/125090

PCT Pub. Date: Jun. 16, 2022

(65) Prior Publication Data

US 2024/0040250 A1 Feb. 1, 2024

(51) Int. Cl.
*H04N 23/68* (2023.01)

(52) U.S. Cl.
CPC ....... *H04N 23/683* (2023.01); *H04N 23/6811* (2023.01); *H04N 23/6812* (2023.01)

(58) Field of Classification Search
None
See application file for complete search history.

(56) References Cited

U.S. PATENT DOCUMENTS

| | | | | | |
|---|---|---|---|---|---|
| 10,462,370 | B2 * | 10/2019 | Shi | ............................ | G06T 5/50 |
| 11,166,003 | B1 * | 11/2021 | Herman | .................. | B60R 11/04 |
| 12,294,744 | B2 * | 5/2025 | Zhang | ..................... | G06F 3/011 |
| 2010/0231593 | A1 | 9/2010 | Zhou et al. | | |
| 2014/0132786 | A1 | 5/2014 | Saitwal et al. | | |

(Continued)

FOREIGN PATENT DOCUMENTS

| | | | |
|---|---|---|---|
| DE | 202018104433 | U1 | 10/2018 |
| JP | 2004158902 | A | 6/2004 |

(Continued)

OTHER PUBLICATIONS

International Searching Authority, International Search Report and Written Opinion mailed on Sep. 9, 2021, issued in connection with International Patent Application No. PCT/US2020/064166, filed on Dec. 10, 2020, 10 pages.

(Continued)

*Primary Examiner* — Cynthia Calderon
(74) *Attorney, Agent, or Firm* — McDonnell Boehnen Hulbert & Berghoff LLP

(57) ABSTRACT

Apparatus and methods related to stabilization of video content are provided. An example method includes receiving, by a mobile computing device, one or more image parameters associated with a video frame of a plurality of video frames. The method further includes receiving, from a motion sensor of the mobile computing device, motion data associated with the video frame. The method also includes predicting, by applying a neural network to the one or more image parameters and the motion data, a stabilized version of the video frame.

20 Claims, 10 Drawing Sheets

(56) References Cited

U.S. PATENT DOCUMENTS

| | | | | |
|---|---|---|---|---|
| 2017/0134746 | A1 | 5/2017 | Lawrence et al. | |
| 2019/0104255 | A1 | 4/2019 | Shi et al. | |
| 2019/0122373 | A1 | 4/2019 | Natroshvili et al. | |
| 2019/0246023 | A1 | 8/2019 | Wu et al. | |
| 2020/0077023 | A1* | 3/2020 | Kang | G06N 3/09 |
| 2020/0349680 | A1 | 11/2020 | Tao et al. | |
| 2020/0364554 | A1* | 11/2020 | Wang | G06T 7/11 |
| 2021/0014399 | A1 | 1/2021 | Yamazaki | |
| 2022/0086360 | A1 | 3/2022 | Deng et al. | |
| 2022/0292867 | A1* | 9/2022 | Zhang | G06V 10/82 |

FOREIGN PATENT DOCUMENTS

| | | | |
|---|---|---|---|
| JP | 2019121941 | A | 7/2019 |
| JP | 2020520603 | A | 7/2020 |
| KR | 20090016553 | A | 2/2009 |
| KR | 20140073527 | A | 6/2014 |
| WO | 2020192209 | A1 | 10/2020 |

OTHER PUBLICATIONS

CS231n Convolutional Neural Networks for Visual Recognition, Convolutional Neural Networks (CNNs/ConvNets), 2020, 23 pages.

Keras Conv2D, "Keras Conv2D: Working with Cnn 2D Convolutions in Keras," missinglink.ai, 2020, 13 pages.

Lee et al., "Vido Stabilization Algorithm of Shaking Image using Deep Learning," The Journal of the the Institute of Internet, Broadcasting and Communication, Feb. 28, 2019, pp. 145-152, vol. 19, No. 1 (English Abstract).

Liang et al., "Fused Video Stabilization on the Pixel 2 and Pixel 2 XL," Google AI Blog, Nov. 10, 2017, 10 pages.

Sak et al., "Long Short-Term Memory Recurrent Neural Network Architectures for Large Scale Acoustic Modeling," Interspeech, 2014, 5 pages.

Wang et al., "Deep Online Video Stabilization With Multi-Grid Warping Transformation Learning," IEEE Transactions on Image Processing, May 2019, pp. 2283-2292, vol. 28, No. 5.

Wei, Jerry, "VGG Neural Networks: The Next Step After AlexNet," Towards Data Science, Jul. 3, 2019, 6 pages.

* cited by examiner

ENHANCED VIDEO STABILIZATION BASED ON MACHINE LEARNING MODELS

The present application is a national stage entry of PCT/US2020/064166 filed on Dec. 10, 2020, the contents of which is hereby incorporated by reference.

BACKGROUND

Many modern computing devices, including mobile phones, personal computers, and tablets, include image capture devices, such as video cameras. Some image capture devices and/or computing devices can correct or otherwise modify captured images. For example, the camera or subject may move during exposure, causing the video to appear blurry and/or distorted.

Accordingly, some image capture devices can correct this blur and/or distortion. After a captured image has been corrected, the corrected image can be saved, displayed, transmitted, and/or otherwise utilized.

SUMMARY

The present disclosure generally relates to stabilization of video content. In one aspect, an image capture device may be configured to stabilize an input video. Powered by a system of machine-learned components, the image capture device may be configured to stabilize a video to remove distortions and other defects caused by an unintended shaking of the image capture device, a motion blur caused by a movement of an object in a video, and/or artifacts that may be introduced into the video images while the video is being captured.

In some aspects, mobile devices may be configured with these features so that an input video can be enhanced in real-time. In some instances, a video may be automatically enhanced by the mobile device. In other aspects, mobile phone users can non-destructively enhance a video to match their preference. Also, for example, pre-existing videos in a user's video library can be enhanced based on techniques described herein.

In a first aspect, a computer-implemented method is provided. The method includes receiving, by a mobile computing device, one or more image parameters associated with a video frame of a plurality of video frames. The method also includes receiving, from a motion sensor of the mobile computing device, motion data associated with the video frame. The method further includes predicting, by applying a neural network to the one or more image parameters and the motion data, a stabilized version of the video frame.

In a second aspect, a device is provided. The device includes one or more processors operable to perform operations. The operations include receiving, by a mobile computing device, one or more image parameters associated with a video frame of a plurality of video frames. The operations further include receiving, from a motion sensor of the mobile computing device, motion data associated with the video frame. The operations also include predicting, by applying a neural network to the one or more image parameters and the motion data, a stabilized version of the video frame.

In a third aspect, an article of manufacture is provided. The article of manufacture may include a non-transitory computer-readable medium having stored thereon program instructions that, upon execution by one or more processors of a computing device, cause the computing device to carry out operations. The operations include receiving, by a mobile computing device, one or more image parameters associated with a video frame of a plurality of video frames. The operations further include receiving, from a motion sensor of the mobile computing device, motion data associated with the video frame. The operations also include predicting, by applying a neural network to the one or more image parameters and the motion data, a stabilized version of the video frame.

In a fourth aspect, a system is provided. The system includes means for receiving, by a mobile computing device, one or more image parameters associated with a video frame of a plurality of video frames; means for receiving, from a motion sensor of the mobile computing device, motion data associated with the video frame; and means for predicting, by applying a neural network to the one or more image parameters and the motion data, a stabilized version of the video frame.

Other aspects, embodiments, and implementations will become apparent to those of ordinary skill in the art by reading the following detailed description, with reference where appropriate to the accompanying drawings.

DETAILED DESCRIPTION

Figure 1:
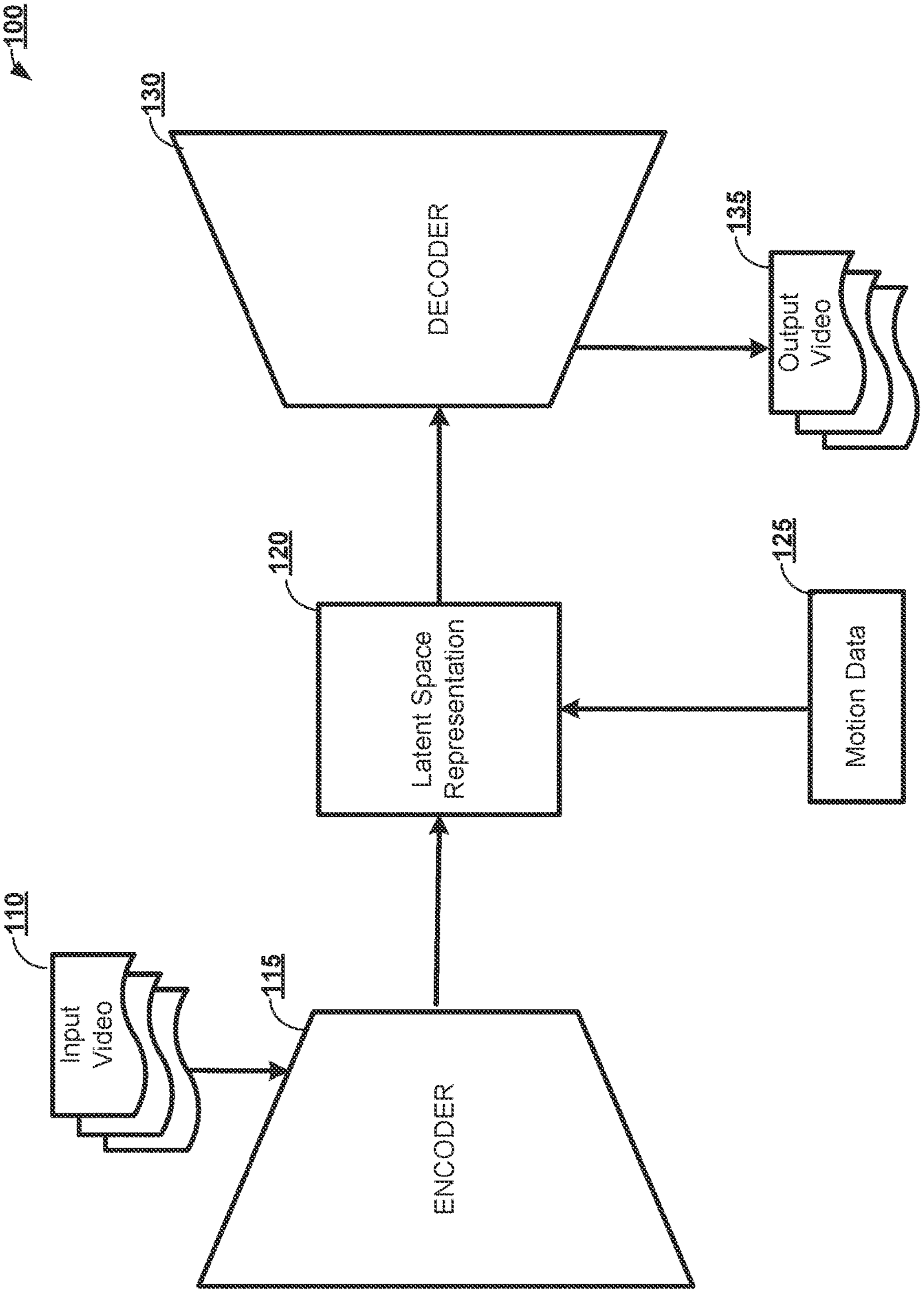
FIG. 1 is a diagram illustrating a neural network for video stabilization, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

This application relates to video stabilization using machine learning techniques, such as, but not limited to, neural network techniques. When a user of a mobile computing device captures a video, the resulting images may not always be smooth and/or steady. Sometimes, this can be caused by an unintentional shaking of a user's hand. For example, when a video is captured from a moving vehicle, or is captured while walking, and/or running, the camera may shake, and the resulting video images may not appear steady. As such, an image-processing-related technical problem arises that involves stabilizing of the video.

To remove undesirable motions during image capture, some techniques apply a model based on a convolutional neural network to stabilize the captured video. In some examples, motion data and optical image stabilization (OIS) data can be combined to output a stabilized video. Such techniques are generally fast and may be performed efficiently on a mobile device. Also, in some examples, since image data is not used, such a technique can be robust to possible scene and illumination changes.

Image-based techniques are available as desktop applications for post-video editing. These techniques generally require more computational power as they involve feature extraction from images, extraction of an optical flow, and global optimization. Existing neural network based techniques involve taking image frames as input, and inferring a warping grid as an output to generate a stabilized video. However, there may be image distortions due to the lack of rigidity control of the warping grid.

The herein-described techniques may include aspects of the image-based techniques in combination with techniques based on motion data and optical image stabilization (OIS) data.

A neural network, such as a convolutional neural network, can be trained and applied to perform one or more aspects as described herein. In some examples, the neural network can be arranged as an encoder/decoder neural network.

In one example, a deep neural network (DNN) has a U-net structure. The DNN takes one or more video frames as input to an encoder, and transforms the data into a low-dimensional latent space representation. In some aspects, the latent space representation is based on the real camera pose. For example, the DNN determines a real camera pose from the motion data, and this is added to the latent space representation. The DNN utilizes the latent space representation to infer a virtual camera pose. In some aspects, a long short term memory (LSTM) unit can be utilized to infer the virtual camera pose. The virtual camera pose involves rotation and/or translation information. The DNN then utilizes the virtual camera pose to generate a warping grid for video stabilization. In some aspects, a long short term memory (LSTM) unit can be utilized to generate the warping grid. Also, a real camera pose history (comprising real camera poses for past, current, and future video frames), and a virtual camera pose history (comprising virtual camera poses for past, and current video frames) can be added to the latent space representation to train the DNN. In some embodiments, the warping grid can be applied to the predicted virtual camera pose to output the stabilized version. Thus, a trained neural network can process an input video to predict a stabilized video.

In one example, (a copy of) the trained neural network can reside on a mobile computing device. The mobile computing device can include a camera that can capture an input video. A user of the mobile computing device can view the input video and determine that the input video should be stabilized. The user can then provide the input video and motion data to the trained neural network residing on the mobile computing device. In response, the trained neural network can generate a predicted output that shows a stabilized video and subsequently outputs the output video (e.g., provide the output video for display by the mobile computing device). In other examples, the trained neural network is not resident on the mobile computing device; rather, the mobile computing device provides the input video and motion data to a remotely-located trained neural network (e.g., via the Internet or another data network). The remotely-located convolutional neural network can process the input video and the motion data as indicated above and provide an output video that shows the stabilized video. In other examples, non-mobile computing devices can also use the trained neural network to stabilize videos, including videos that are not captured by a camera of the computing device.

In some examples, the trained neural network can work in conjunction with other neural networks (or other software) and/or be trained to recognize whether an input video is not stable and/or smooth. Then, upon a determination that an input video is not stable and/or smooth, the herein-described trained neural network could stabilize the input video.

As such, the herein-described techniques can improve videos by stabilizing images, thereby enhancing their actual and/or perceived quality. Enhancing the actual and/or perceived quality of videos can provide user experience benefits. These techniques are flexible, and so can apply to a wide variety of videos, in both indoor and outdoor settings.

II. Techniques for Video Stabilization Using Neural Networks

FIG. 1 is a diagram illustrating a neural network 100 for video stabilization, in accordance with example embodiments. Neural network 100 may include an encoder 115 and a decoder 130. A mobile computing device may receive one or more image parameters associated with a video frame of a plurality of video frames. For example, input video 110 may comprise a plurality of video frames. Each video frame of the plurality of video frames may be associated with one or more image parameters. For example, each frame may be associated with image parameters such as frame metadata, including an exposure time, a lens position, and so forth. In some embodiments, image parameters of successive frames input video 110 may be utilized to generate an optical flow. For example, given a pair of video frames, a dense per-pixel optical flow may be generated. The optical flow provides a correspondence between two consecutive frames, and is indicative of image motion from one frame to the next. The one or more image parameters, and/or the optical flow, may be input to encoder 115.

In some embodiments, the mobile computing device may receive motion data 125 associated with input video 110. For example, a motion sensor may maintain a log of timestamp data associated with each video frame. Also, for example, the motion sensor may capture motion data 125 that tracks a real camera pose for each video frame. The term "pose" as used herein, generally refers to a rotation of an image capturing device, such as a video camera. In some embodiments, the term "pose" may also include a lens offset for the image capturing device. In some example embodiments, the real camera pose may be captured at a high frequency, such as, for example, 200 Hertz (Hz). The motion sensor may be a gyroscopic device that is configured to capture a gyroscopic signal associated with input video 110. Accordingly, the real camera pose may be inferred with high accuracy based on the gyroscopic signal. Also, each video frame may be associated with a timestamp. Therefore, past and future video frames and respective rotations may be determined with reference to a current video frame.

Neural network 100 may be applied to the one or more image parameters and the motion data to predict a stabilized version of input video 110. For example, encoder 115 may generate a latent space representation 120 based on the one or more image parameters. Motion data (e.g., a real camera pose) can also be input to the latent space representation 120. Decoder 130 utilizes the latent space representation 120 to predict the stabilized version. The predicted output video 135 may thus be generated frame by frame. Unlike the training phase, during the runtime phase, stabilization of the video frames is performed in real-time. Accordingly, a long sequence of video frames is not needed during the runtime phase.

Figure 2:
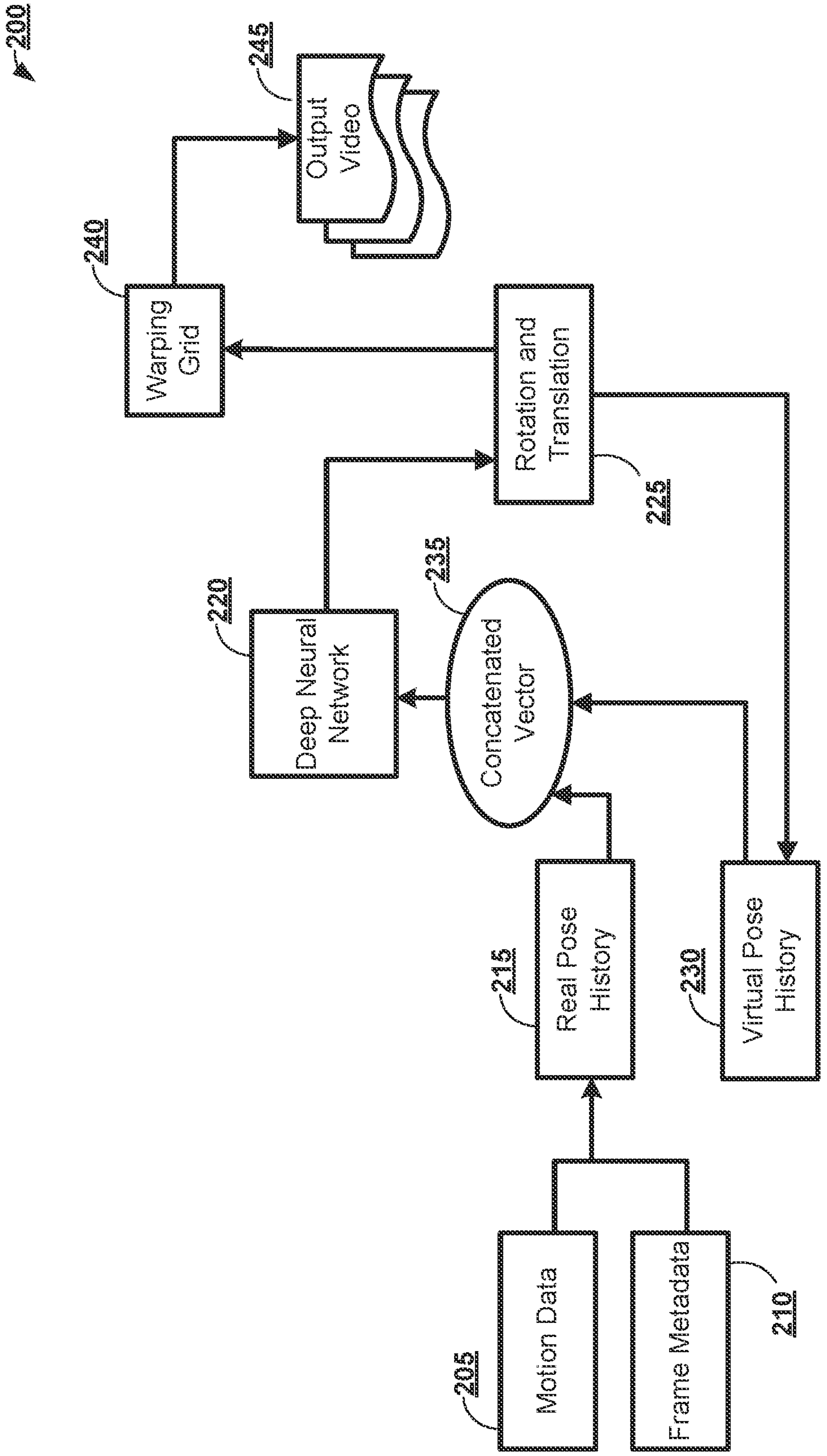
FIG. 2 is a diagram illustrating another neural network for video stabilization, in accordance with example embodiments.

FIG. 2 is a diagram illustrating another neural network 200 for video stabilization, in accordance with example embodiments. Motion data 205 represents data from a motion sensor. In some embodiments, the motion sensor may be a gyroscope. Generally, a mobile device may be equipped with a gyroscope and the gyroscopic signal may be captured from the mobile device. A gyro event handler in a mobile device may continuously fetch a gyroscopic signal, and estimate a real camera pose, R(t). The gyroscopic signal may be received at a high frequency (e.g., 200 Hz). Motion data 205 may include angular velocity and a timestamp, and may indicate a rotation of the real camera at a given time.

In some embodiments, a mobile device may be configured with an OTS lens shift handler that can be configured to read out OIS movement from motion data 205 along a horizontal x-axis or a vertical y-axis. The OIS data may be sampled at a high frequency (e.g., 200 Hz), and this may provide a translation in the x and y directions. This can be modeled into an offset for a camera's principal axis. In some embodiments, the OIS readout may not be included, so that only a rotation of the camera is utilized to train neural network 200. For example, each RGB frame includes motion data 205 indicative of a rotation (e.g., a hand movement) and a translation (e.g., OIS movement). Accordingly, the motion data 205 indicative of the translation can be removed.

In other examples, both the rotation and the translation can be utilized. The translation occurs in the x-, and y-axes. An OTS lens shift handler can be configured to continuously fetch OIS readout, and convert the OIS readout into 2D pixel offset in pixel, as given by:

$$O_{len}(t) = (O_{len}(x, t), O_{len}, (y, t)) \quad \text{(Eqn. 1)}$$

where $O_{len}(t)$ is an OIS lens offset at time t, and this offset includes a horizontal offset $O_{len}(x, t)$ along the x-axis, and a vertical offset $O_{len}(y, t)$ along the y-axis.

In some embodiments, the mobile device can comprise a motion model constructor that constructs a projection matrix. Given an input video frame, associated frame metadata 210 may include exposure time at each scanline and a lens position. The motion model constructor can take the exposure time, the lens position, the real camera pose, and the OIS lens offset, to construct the projection matrix, $P_{i,j}$, that maps a real world scene to an image, where i is a frame index and j is a scanline index.

For purposes of this description, a subscript "r" denotes "real" and a subscript "v" denotes virtual. As described, a camera pose may generally include two components, a rotation, and a translation. The real camera pose, $V_r(T)$, at time T can represented as:

$$V_r(T) = [R_r(T), O_r(T)] \quad \text{(Eqn. 2)}$$

where $R_r(T)$ is an extrinsic matrix (a rotation matrix) of a camera (e.g., a camera of the mobile device), $O_r(T)$ is a 2D lens offset of a principal point Pt, and T is a timestamp of a current video frame. A projection matrix can be determined as $P_r(T)=K_r(T)*R_r(T)$, where $K_r(T)$ is an intrinsic matrix of the camera, and is given by:

$$K_r(T) = \begin{bmatrix} f & 0 & Pt_{x(T)} + O_{x(T)} \\ 0 & f & Pt_{y(T)} + O_{y(T)} \\ 0 & 0 & 1 \end{bmatrix} \quad \text{(Eqn. 3)}$$

where $f$ is a focal length of a camera lens, Pt is a 2-dimensional (2D) principal point which can be set to a center of the image of the current video frame at time T. Accordingly, a 3-dimensional (3D) point X is projected into a 2D image space as $x=P_r(T)$ X, where x is the 2D homogeneous coordinate in the image space. In some embodiments, the OIS data indicative of translation may not be used. In such cases, the camera intrinsic matrix can be determined as:

$$K_r(T) = \begin{bmatrix} f & 0 & Pt_{x(T)} \\ 0 & f & Pt_{y(T)} \\ 0 & 0 & 1 \end{bmatrix} \quad \text{(Eqn. 4)}$$

Real pose history 215 includes real camera poses in the past, current and future video frames:

$$R_r = (R_r(T - N * g), \ldots , R_r(T), R_r(T + N * g)) \quad \text{(Eqn. 5)}$$

where T is a timestamp of a current frame, N is a number of look-ahead video frames. Also, virtual pose history 230 includes virtual camera poses in the past M video frames, as predicted by deep neural network (DNN) 220:

$$R_v = (R_v(T - M * g), \ldots , R_v(T - 1 * g)) \quad \text{(Eqn. 6)}$$

where M is a length of virtual pose history. In some example implementations, a value of M=2 may be used. A fixed timestamp gap g (e.g. g=33 milliseconds) may be used to make the process invariant to a video's frame rate, as measured in frames per second (FPS). In some example implementations, a real camera pose history 215 may include real camera pose information for 21 video frames, including a current video frame, 10 previous video frames, and 10 future video frames. A virtual camera pose history 230 may include virtual camera pose information for a current and one or more past video frames, since a virtual pose for future video frames is not generally known at run-time. In some implementations the number of past video frames used for a real camera pose history 215 and a virtual camera pose history 230 may be the same. The real camera pose history 215 and the virtual camera pose history 230 may be concatenated to generate a concatenated feature vector 235.

DNN 220 may take as input the concatenated vector 235 and output a rotation $R_v(T)$ for the virtual camera pose corresponding to the video frame with a timestamp T. DNN 220 may generate a latent space representation, as described below.

Given a real camera pose, $V_r(T)$, and a virtual camera pose, $V_v(T)$, two projection matrices may be determined, and denoted as $P_r(T)$ and $P_v(T)$. The mapping from 2D real camera domain $x_r$ to 2D virtual camera domain $x_v$ may be determined as:

$$x_v = P_{real\ to\ virtual}(T) * x_r, \qquad \text{(Eqn. 7)}$$

where the real to virtual projection matrix, $P_{real\ to\ virtual}$, is given as:

$$P_{real\ to\ virtual}(T) = P_v(T) * P_r^{-1}(T) = K_v(T) * R_v(T) * R_r^{-1}(T) * K_r^{-1}(T). \qquad \text{(Eqn. 8)}$$

where $A^{-1}$ denotes an inverse of a matrix A. Here, $K_v(T)$ is an intrinsic matrix of the camera corresponding to a virtual camera pose, $R_v(T)$ is a predicted rotation for the virtual camera pose, $K_r(T)$ is an intrinsic matrix of the camera corresponding to a real camera pose, and $R_r(T)$ is a rotation for the real camera pose. This is a 2D to 2D mapping, and can be used to map a real camera image to a virtual camera image. As Eqn. 8 indicates, an inverse of a projection of a 2D real point is computed to obtain a point in 3D space using the inverse projection map for real camera projection, $P_r^{-1}(T)$, and then this point in 3D space is projected back to the 2D space by using the projection map $P_v(T)$ for the virtual camera projection. The rotation map, R can be represented in several ways, such as, for example, by a 3×3 matrix, a 1×4 Quaternion or a 1×3 axis angle. These different representations are equivalent and can be chosen based on a context. For example, the 3×3 matrix representation is used to calculate the projection matrix, $P_{real\ to\ virtual}$. However to input a camera pose history into DNN 220, a quaternion or axis angle representation may be used. These representations may be converted from one to another and are equivalent.

In some embodiments, real pose history 215 and virtual pose history 230 may include OIS lens shift data, and the deep neural network may output a translation 225 corresponding to a predicted lens shift for a virtual camera. The predicted rotation and/or translation 225 may be added to virtual pose history 230. Also, for example, the predicted rotation and/or translation 225 may be provided to an image warping grid 240. Image warping grid 240 may load the output from DNN 200, and map each pixel in the input frame to an output frame, thereby generating output video 245.

DNN 220 may be trained based on a loss function, L, such as:

$$L = w_{C0} * \|R_v(t) - R_v(t-1)\|^2 + w_{follow} * \sum_{i=-n}^{n} \|R_v(t) - R_r(t - +i)\|^2 + w_{C1} * \|R_v'(t) - R_v'(t-1)\|^2 \qquad \text{(Eqn. 9)}$$

where $R_v(t)$ is a virtual pose at time t, and $R'_v(t)$ is a change in a virtual pose between successive video frames. Accordingly, $R_v(t)-R_v(t-1)$ denotes a change in a virtual pose between two successive video frames at time t and t−1. The term $\|R_v(t)-R_v(t-1)\|^2$ can be multiplied with an associated weight, $w_{C0}$. $R_v(t)-R_r(t+i)$ is a difference between a virtual pose at time t and a real pose at time t+i, where i is an index that takes values over past, current and future real poses. This is indicative of how closely a virtual camera pose "follows" a real camera pose. The term $$\sum_{i=-n}^{n} \|R_v(t) - R_r(t+i)\|^2$$

can be multiplied with an associated weight, $w_{follow}$. Also, for example, $R'_v(t)-R'_v(t-1)$ measures a difference between a current virtual camera pose and the previous virtual camera pose, $R'_v(t)$, and a change between the previous virtual camera pose and the virtual camera pose previous to the previous one, $R'_v(t-1)$. The term $\|R'_v(t)-R'_v(t-1)\|^2$ can be multiplied with an associated weight, $w_{C1}$.

For the training phase of DNN 220, a virtual pose history 230 may be initialized with a virtual queue with no rotations. A random selection of N consecutive video frames can be input with real pose history 215. A concatenated vector 235 for the real pose history 215 and virtual pose history 230 can be input to DNN 220. The output, for each video frame of the input, is a virtual rotation 225. The virtual rotation 225 can be fed back to virtual pose history 230 to update the initial queue. The overall loss given by Eqn. 9 may be backpropagated for each video frame. During the inference phase, a video frame sequence may be input and a stabilized output video 245 corresponding to the input video may be obtained.

Figure 3:
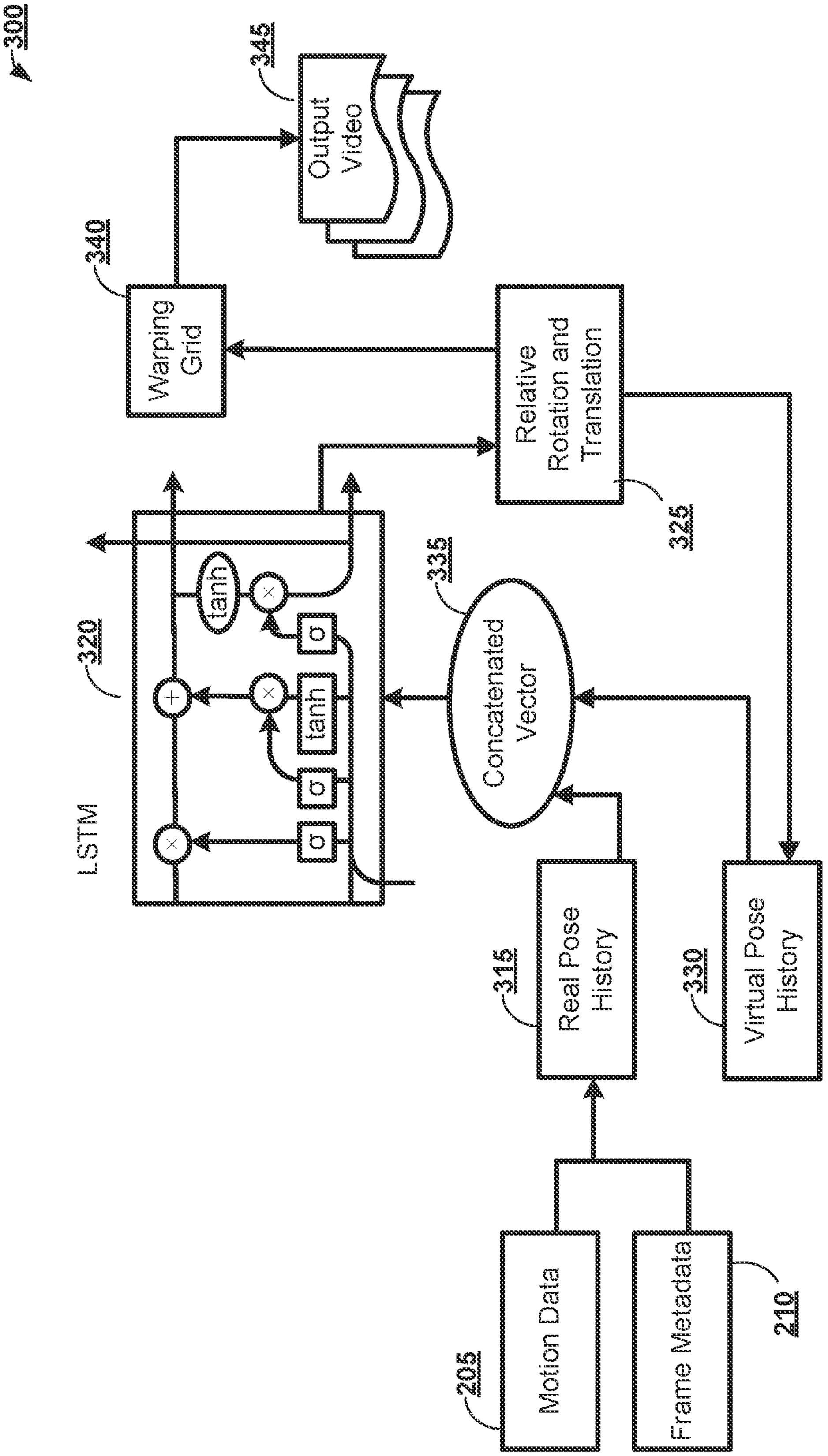
FIG. 3 is a diagram illustrating a long short term memory (LSTM) network for video stabilization, in accordance with example embodiments.

FIG. 3 is a diagram illustrating a long short term memory (LSTM) network 300 for video stabilization, in accordance with example embodiments. One or more aspects of the architecture for network 300 may be similar to aspects of the network 200 of FIG. 2. For example, motion data 205 and frame metadata 210 may be processed to generate a real pose history 315. To initialize the process, a virtual pose history 330 may be generated with identity rotations. Real pose history 315 and virtual pose history 330 may be input to DNN 220 of FIG. 2.

As illustrated in FIG. 3, DNN 220 may include a LSTM component 320. LSTM component 320 is a recurrent neural network (RNN) that models long range dependencies in temporal sequences, such as, for example, a sequence of time stamped video frames. Generally, LSTM component 320 includes memory blocks in a recurrent hidden layer. Each memory block includes memory cells that store a temporal state of the network and one or more logic gates that control a flow of information. LSTM component 320 computes a mapping from the input concatenated feature vector 335, and outputs a virtual pose 325.

In some embodiments, the method includes determining, from the rotation data and the timestamp data, a relative rotation of a camera pose in the video frame relative to a reference camera pose in a reference video frame, and the predicting of the stabilized version is based on the relative rotation. For example, instead of inputting absolute rotations into LSTM component 320, the absolute rotations are converted to relative rotations, or change of rotations. This is based on an observation that for similar types of motion, absolute rotations may not be the same, as they may depend on when the rotation is initialized, i.e. where the origin is. On the other hand, relative rotations preserve similarities. For example, taking 1D samples, (1, 2, 3) and (4, 5, 6) for purposes of illustration, these two samples are not the same. However, relative changes for these samples may be determined. For example, taking element wise differences in (1, 2, 3) with respect to the first element "1," the differences are 1−1=0, 2−1=1, and 3−1=2. Accordingly, the relative rotation vector can be determined to be (0, 1, 2). Similarly, taking element wise differences in (4, 5, 6) with respect to the first element "4," the differences are 4−4=0, 5−4=1, and 6−4=2. Accordingly, the relative rotation vector can again be determined to be (0, 1, 2). Thus, although absolute rotation was different, the relative rotations are the same. In this way, the inputs are more representative to sets of similar motions, and much less training data is required.

The LSTM component 320 predicts a virtual rotation change $dR_v(T)$ that is relative to a previous virtual pose $R_v(T-1)$ and a virtual lens offset that is relative to a frame center, $O_v=(o'_x, o'_y)$. The virtual camera pose may be determined as comprising of a rotation and a translation 325, and given by $(R_v(T), O_v(T))$, where $$R_v(T) = dR_v(T) * R_v(T-g). \quad \text{(Eqn. 10)}$$

Thus, for the real pose history 315, for a current rotation $R_r$ (T) and next rotation $R_r$ (T+g), instead of inputting these absolute rotations into LSTM component 320, the current rotation $R_r(T)$ may be used as a reference frame, or an anchor, and relative difference rotations may be determined, such as $dR_r=R_r(T+k*g)*R_r^{-1}(T)$, where k=1, . . . , N. These relative rotations may then be added to real pose history 315, and input into LSTM component 320. An example where relative rotations are useful in stabilizing video frames is when the camera captures an image using a panning motion. In such an instance, a panning speed is consistent, but the real pose is different at each time step. Since the absolute rotation is integrated from the first span, the real pose can be different. However, relative rotations are generally similar. So LSTM component 320 can be sensitive to such motions where relative rotations are minimal.

As described herein, LSTM component 320 outputs rotations and/or translations 325. However, a relative rotation is predicted instead of an absolute rotation. The output is a change of rotation multiplied with a previous rotation of the virtual camera pose for the previous frame. So the virtual camera pose for the current frame may be determined as a multiple of a delta virtual pose of the current frame and the virtual pose of the previous frame. Accordingly, LSTM component 320 outputs relative rotations 325 given by $dV_t$, and the virtual pose for a video frame corresponding to time t may be determined as $V_t=dV_t*V_{t-1}$, based on the virtual pose for a video frame corresponding to time t−1 and the relative rotation for the virtual pose as output by the LSTM component 320.

Also, for the virtual lens offset or translation, this may be inferred from LSTM component 320, or the lens offset may be set to (0, 0). Therefore, the lens position may be fixed to a principal center and the rotation alone can be used to stabilize the video frame.

As indicated, absolute rotation is replaced with relative rotation. For example, a sequence of real pose history 215 of FIG. 2 given by $[R_0, R_1, R_2, \ldots]$ may be substituted with a sequence of real pose history 315 given by $$[I, R_1 * R_0^{-1}, R_2 * R_0^{-1}, \ldots],$$

where $R_0$ is a rotation of a reference video frame. Accordingly, $$R_t * R_0^{-1}$$

is a measure of a relative change in rotation with respect to $R_0$, which may be generally small. Similarly, for a sequence of virtual pose history 230 of FIG. 2 given by $[V_0, V_1, V_2, \ldots]$ may be substituted with a sequence of real pose history 330 given by $$[V_0 * R_0^{-1}, V_1 * R_0^{-1}, V_2 * R_0^{-1}, \ldots],$$

where $R_0$ is a rotation of a reference video frame. Accordingly, $$V_t * R_0^{-1}$$

is a measure of a difference between a virtual rotation from a reference real rotation.

In some embodiments, the neural network may be trained to receive a particular video frame and output, based on one or more image parameters and motion data associated with the particular video frame, a stabilized version of the particular video frame. For example, for a training phase in network 300, a virtual pose history 330 may be initialized with a virtual queue with identity rotations. A random selection of N consecutive video frames may be input with real pose history 315 that includes relative rotations. A concatenated vector 335 for the real pose history 315 and the virtual pose history 330 can be input to LSTM component 320. The output, for each video frame of the input, is a virtual relative rotation 325. The virtual relative rotation 325 can be added back to virtual pose history 330 to update the initial queue. During the inference phase, a video frame sequence may be input and a stabilized output 345 corresponding to the input may be obtained. Also, an image loss may be determined, as discussed in more detail below. Additionally, OIS data with translation may be used for lens offsets, and relative rotation and translation 325 may comprise relative rotations and lens offsets for the virtual camera. Also, for example, a multi-stage training may be performed, as described in more detail below. In some example implementations, modified versions of LSTM component 320 may be used. For example, LSTM component 320 may be a deep LSTM RNN obtained by stacking a plurality of layers of LSTM component 320.

Figure 4:
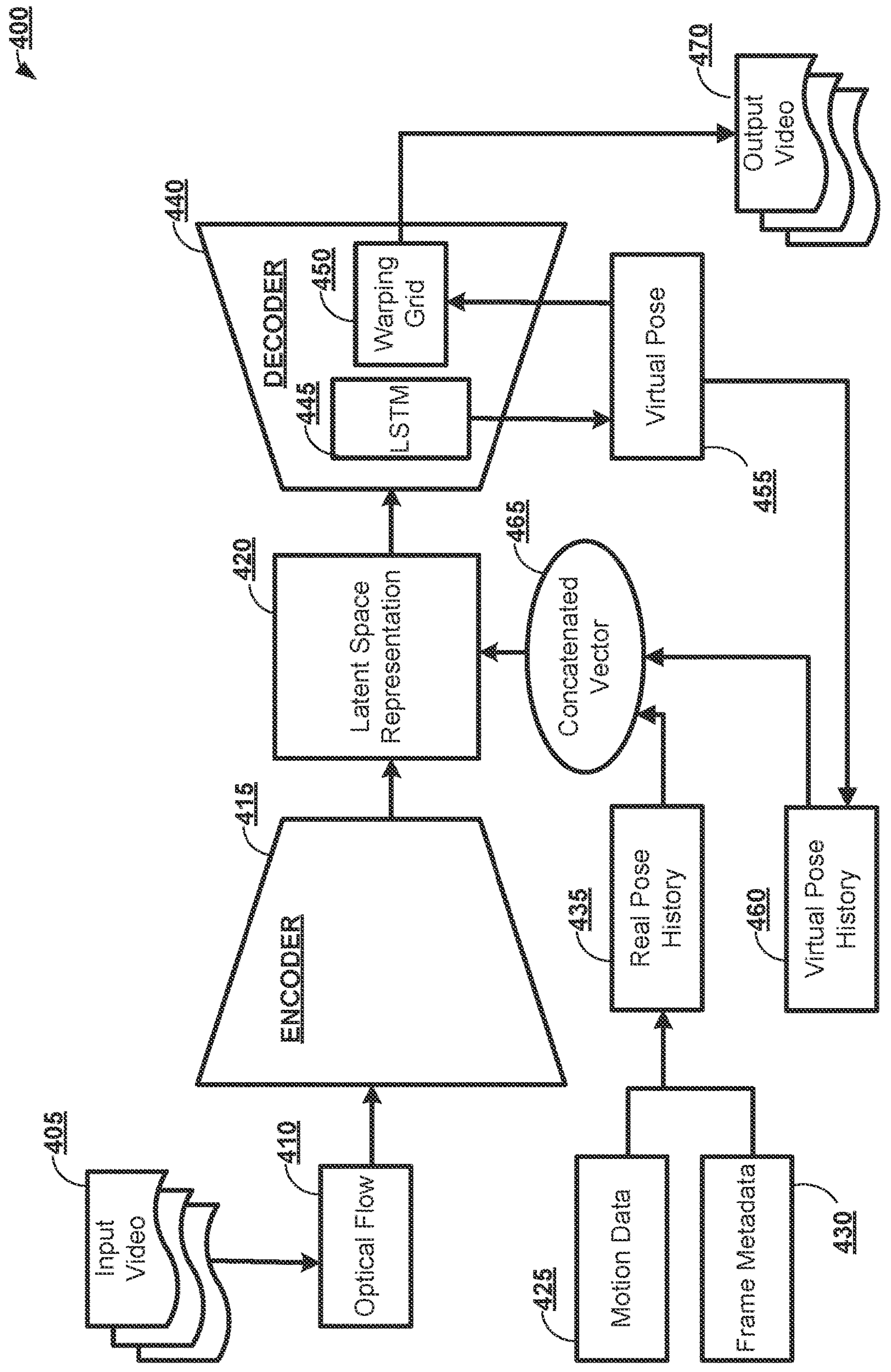
FIG. 4 is a diagram illustrating a deep neural network for video stabilization, in accordance with example embodiments.

FIG. 4 is a diagram illustrating a deep neural network (DNN) 400 for video stabilization, in accordance with example embodiments. One or more aspects of DNN 400 may be similar to aspects of networks 200 and 300. Input video 405 may include a plurality of video frames. An optical flow 410 may be generated from input video 405. For example, an optical flow extractor (e.g., on the mobile device) can be configured to extract optical flow 410. Generally, given a consecutive pair of video frames, a dense per-pixel optical flow 410 may be computed. The optical flow 410 provides a correspondence between two frames, and may be used as an input to DNN 400 for video stabilization.

Figure 5:
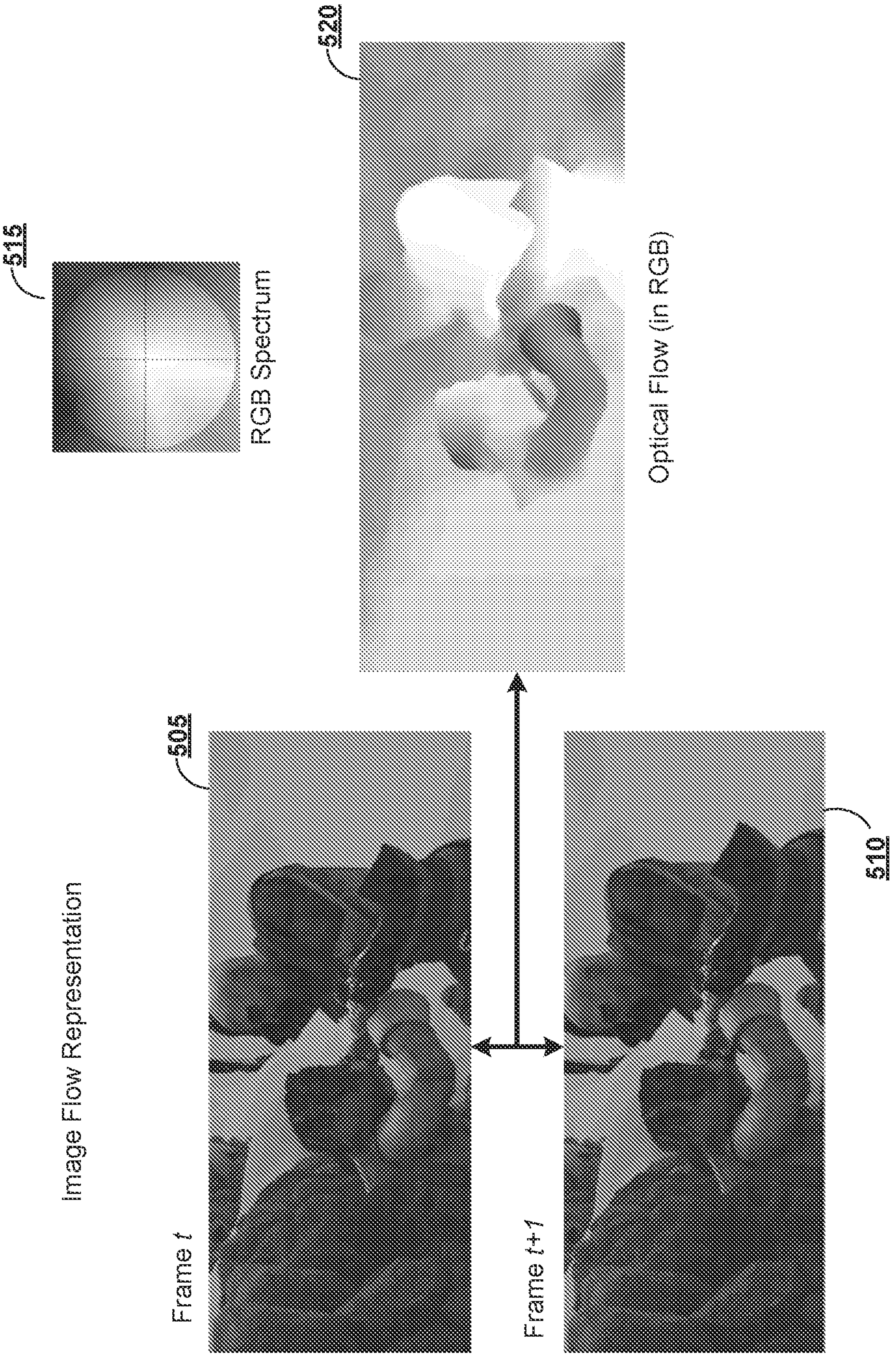
FIG. 5 depicts an example optical flow, in accordance with example embodiments.

FIG. 5 depicts an example optical flow, in accordance with example embodiments. Two successive video frames are shown, a first frame 505 corresponding to a timestamp of time t, and a second frame 510 corresponding to a timestamp of time t+1. An RGB spectrum 515 is illustrated for reference. Optical flow 520 may be generated from first frame 505 and second frame 510. The optical flow 520 may be generated from the successive video frames, in both a forward and a backward direction, e.g. from frame t to t+1, and from frame t+1 to t.

Referring again to FIG. 4, optical flow 410 may be input into encoder 415, and a latent space representation 420 may be generated. As described previously, the latent space representation 420 is a low-dimensional representation.

Also, for example, motion data 425 (e.g., similar to motion data 205) and frame metadata 430 (e.g., similar to frame metadata 210) may be utilized to generate the real pose history 435. For example, the real pose history 435 may be composed of a rotation and translation of video frames going back to past N frames, future N frames, and a current frame.

Initially, the virtual pose history 460 may be set to identity rotations and a lens offset of (0, 0). The virtual pose history 460 may be composed of predicted virtual poses of one or more past video frames, and without the future frames, as these have not been predicted. The lookback for the virtual camera can also be N frames or may be different. Generally, the frame rate for a video frame may change. For example, the frame rate may be 30 fps or 60 fps. Accordingly, a fixed timestamp gap (e.g., 33 ms) may be set, which corresponds to a 30 fps setting. A concatenated vector 465 may be generated based on the real pose history 435 and the virtual pose history 460. The concatenated vector may be input into the latent space representation 420. The decoder 440 may be composed of an LSTM component 445 (e.g., LSTM component 320) and a warping grid 450 (e.g., warping grid 240 or 340). LSTM component 445 may use the latent space representation 420 to generate a virtual pose 455 (e.g., a predicted rotation and a predicted translation for the virtual camera).

Virtual pose 455 may be added to virtual pose history 460 to update the queue for virtual poses. For example, after the initial values for the rotations are set to 0, these initial values may be updated as each predicted virtual pose 455 is output by LSTM component 445. Also, for example, instead of absolute rotations, relative rotations may be input for real pose history 435, and a relative virtual pose 455 may be predicted. Warping grid 450 may use virtual pose 455 to stabilize each input video frame, and a stabilized output video 470 may be generated.

An example architecture for DNN 400 to predict the stabilized version may involve a VGG-like convolutional neural network (CNN). For example, the convolutional neural network may be modeled as a U-Net. In some embodiments, an input to encoder 415 may be an optical flow 410. Such a frame of the optical flow (e.g., optical flow 520 of FIG. 5) may be of size (4×270×480). Encoder 415 maps the input optical flow 410 into a low-dimensional latent space representation $L_r$ (e.g., latent space representation 420). Real pose history 435 comprising rotations and translations of a real camera, and virtual pose history 460 comprising predicted rotations and translations of a virtual camera are concatenated to form vector 465.

Concatenated vector 465 is then concatenated with latent space representation $L_r$ to generate latent space representation, $L_v=(L_r, dR_r, dR_v)$, where $dR_r$ denotes a relative rotation for real camera pose, and $dR_v$ denotes a relative rotation for a virtual camera pose. Decoder 440 in the U-net may include the LSTM component 445 and a differentiable warping grid 450. Specifically, the LSTM component 445 outputs a virtual pose 455 that includes a relative rotation, which is then input into the differentiable warping grid 450 to generate a warped stabilized frame of output video 470.

In one example implementation of DNN 400, an input size of forward and backward optical flows 410 may be (4, 270, 480). There may be a total 5 CNN hidden layers, with sizes (8, 270, 480), (16, 67, 120), (32, 16, 30), (64, 4, 7), and (128, 1, 1). Each hidden layer may be generated by a 2D operation with a Rectified Linear Unit (ReLU) activation function. The features from the optical flows 410 may be resized to 64 by a fully connected (FC) layer, before it concatenates with concatenated vector 465. The input data size for the latent space representation 420 may be (21+10) *4+64, which corresponds to 21 poses for real pose history 435 (e.g., real poses from 10 past video frames, 10 future video frames, and the current video frame), 10 poses for virtual pose history 460 (e.g., predicted virtual poses from 10 past video frames), and a 64-dimensional optical flow 410. The latent space representation 420 may be input to a 2-layer LSTM component 445 with size 512 and 512. A hidden state from LSTM component 445 may be fed into an FC layer followed by a Softshrink activation function, to generate the output video 470 (e.g., represented as 4D Quaternions). Generally, the Softshrink activation function can smooth the output and remove noise.

III. Training Machine Learning Models with Loss Functions

The neural networks described herein may be trained based on an optimization process based on one or more loss functions that may be designed to constrain the solution space. For example, a total loss function may be determined as:

$$E = w_{C0} * E_{C0} + w_{C1} * E_{C1} + w_{angle} * E_{angle} + w_{undefined} * E_{undefined} + w_{image} * E_{image} \quad \text{(Eqn. 11)}$$

where w_* are respective weights assigned to each type of loss. These weights may be used to adjust an impact of each loss to the training process. In some embodiments, training of the neural network includes adjusting, for a particular video frame, a difference between virtual camera poses for successive video frames. For example, a C0 smoothness loss may be associated with a weight $w_{C0}$, and the loss may be determined as:

$$E_{C0} = \|dR_v(T) - R_{identity}\|^2 \quad \text{(Eqn. 12)}$$

where $dR_v(T)$ measures a relative rotation for a virtual camera pose with respect to a rotation of a reference frame, $R_{identity}$. A C0 smoothness loss ensures a C0 continuity of the virtual pose changes (i.e. the rotation changes) in a temporal domain. Generally, C0 smoothness means that a current virtual pose is close to a previous virtual pose. In some embodiments, training of the neural network includes adjusting, for a particular video frame, a first order difference between virtual camera poses for successive video frames.

Similarly, a C1 smoothness loss may be associated with a weight $w_{C1}$, and the loss may be determined as:

$$E_{C1} = \|dR_v(T) - dR_v(T-g)\|^2 \quad \text{(Eqn. 13)}$$

The C1 smoothness loss ensures a C1 continuity of the virtual pose changes (i.e. the change of rotation) in a temporal domain. Generally, C1 smoothness means that the change between a current virtual camera pose and a previous virtual camera pose, $dR_v(T)$ is the same as a change between the previous virtual camera pose and the virtual camera pose previous to the previous one, $dR_v(T-g)$. That is the first order derivative is close to each other. So this loss function provides a smoothly changing trajectory for the virtual camera pose. Together, C0 smoothness and C1 smoothness ensures that the virtual camera pose is stable and changing smoothly.

In some embodiments, training of the neural network includes adjusting, for a particular video frame, an angular difference between a real camera pose and a virtual camera pose. For example, another loss that may be measured is the angular loss, $E_{angle}$, indicative of how closely a virtual camera pose follows a real camera pose. The angular loss may be associated with a weight, $w_{angle}$, and may be measured as an angular difference between the virtual camera pose and the real camera pose. Although a desired difference for the angular difference may be 0, a tolerance threshold may be included in some implementations.

Accordingly, $E_{angle}$=Logistic($\theta$, $\theta_{threshold}$) measures an angular difference $\theta$ between the real and virtual camera rotations. A logistic regression may be used to allow this angular loss to be effective when $\theta$ is larger than a threshold, $\theta_{threshold}$. In this way, the virtual camera can still move freely if the deviation of a virtual pose from a real pose is within the threshold, and prevents rotation of the virtual camera from the real camera beyond the threshold value. For example, in some implementations, $\theta_{threshold}$ may be set at 8 degrees, and the virtual camera pose may be allowed to deviate within 8 degrees of the real camera pose. In some embodiments, upon a determination that the angular difference exceeds a threshold angle, the angular difference between the real camera pose and the virtual camera pose may be reduced. For example, when the virtual camera pose deviates more than 8 degrees from the real camera pose, the virtual camera pose may be adjusted to bring the difference between the real camera pose and the virtual camera pose to be less than 8 degrees.

In some embodiments, training of the neural network includes adjusting, for a particular video frame, an area of a distorted region indicative of an undesired motion of the mobile computing device. For example, another loss that may be measured is an area of a distorted region (alternatively referred to herein as an "undefined region") indicative of an undesired motion of the mobile computing device. In some embodiments, areas of distorted regions in one or more video frames that appear after the particular video frame may be determined. For example, an amount of undefined regions from a current video frame to one or more future video frames, such as, for example, N look-ahead frames, may be measured as:

$$E_{undefined} = \sum_{i=0}^{N} w_i * U_i(dR(T)), \quad \text{(Eqn. 14)}$$

where, for each i, $w_i$ is a preset weight that is large for frames closer to the current frame, and decreases with i. The term $U_i$(dR(T) is used to compute an amount of undefined regions using the current virtual pose dR(T) and the real camera pose at timestamp T+i*g. The output is a 1D normalized value that measures a maximum protruded amount between a bounding box for a warped frame (e.g., a frame output by a warping grid) and a boundary of a real image. The loss, $E_{undefined}$, may be associated with a weight, $w_{undefined}$.

If only the undefined regions of the current frame are considered, then the resulting video may not be as smooth. For example, there can be a sudden motion in a future video frame. Accordingly, such a sudden motion in a future frame may need to be accounted for by adjusting the undefined region. One technique may involve taking the undefined regions of the current frame 0 and all future N frames. A difference of all current and future weights $w_i$ may be determined. In some embodiments, the weights as applied may be configured to decrease with distance of a video frame, of the one or more video frames, from a particular video frame. For example, such weights may generally be taken to be Gaussian. Accordingly, a higher weight may be associated with a current frame (indicating a relative importance of the current frame to future frames) and smaller weights may be associated with the future frames. Weights may be selected so that undefined regions of the current frame are treated as more important than the undefined regions of the future frames. If the virtual camera is shaking due to a hand movement, then only the current frame may be used for the undefined region loss. However, when the virtual camera is panning, it is going far away from the current frame, and therefore the virtual camera is configured to follow the real camera. Accordingly, a number of look-ahead frames may be determined based on a type of camera movement. In some example embodiments, 7 or 10 look-ahead video frames may provide good results. Also, a higher number of look-ahead video frames may provide a better output. However, as the number of look-ahead video frames increases, so does a requirement for memory resources. In some mobile devices, up to 30 look-ahead video frames may be used.

In some embodiments, training of the neural network includes adjusting, for a particular video frame, an image loss. Generally, the image loss, $E_{image}$, measures a difference in an optical flow between successive stabilized video frames. As described previously, an optical flow connects corresponding pairs of points in consecutive video frames.

When the motion of a camera is stable, an optical flow magnitude will generally be close to 0. Specifically, for any point $\rho_{f(t-1)}$ at a previous frame at time t−1, a corresponding point, $\rho_{f(t)}$, at frame at time t may be determined using the forward optical flow. Similarly, for any point $\rho_{b(t)}$ at a current frame, a corresponding point, $\rho_{b(t-1)}$, at the previous frame at time t−1 may be determined. Then the image loss, $E_{image}$, can be associated with a weight, $w_{image}$, and may be determined as:

$$E_{image} = \sum \|p_{f(t)} - p_{f(t-1)}\|^2 + \sum \|p_{b(t)} - p_{b(t-1)}\|^2, \quad \text{(Eqn. 15)}$$

As an optical flow comprises both a forward flow and a backward flow, both directions of the optical flow may be used for the image loss function. In a forward flow, a feature difference of the current frame and the previous frame given by $\rho_{f(t)}-\rho_{f(t-1)}$ may be determined. Similarly, for the backward flow, a feature difference between the current frame and the previous frame given by $\rho_{b(t)}-\rho_{b(t-1)}$ may be determined. The output video frame may be stabilized by minimizing these two differences. As the optical flow is a dense optical flow, the sums in Eqn. 15 range over all the image pixels.

During the training phase, a training batch may be determined, for example, by randomly selecting subsequences as a training batch. In some embodiments, a subsequence may include 400 video frames, and each of the 400 video frames may be processed by the neural networks described herein. The loss functions may be combined into an overall loss function, and this may then be backpropagated. By repeating this process, all the parameters of the neural network may be trained. For example, because of the nature of an LSTM, long sub-sequences from a sequence of training video frames may be randomly selected as inputs, and the LSTM process may be applied to each such subsequence in a frame by frame manner. The overall loss on the entire sequence of training video frames may be determined, and then back-propagated. In this way, an LSTM may be trained to learn to represent different motion states (e.g., like walking, running, panning) effectively in the latent space representation.

Generally, the training loss may not converge if a DNN is trained using the overall loss directly. This may be due to a complexity of the problem of video stabilization, and a large size of a feasible solution space. To overcome this challenge, a multi-stage training process may be used as an offline training process to refine the solution space step by step.

For example, in the first stage of the multi-stage training process, C0 & C1 smooth losses and an angular loss may be optimized. In an absence of the first stage, an undefined region loss may increase substantially. At the first stage, the DNN is trained so that the virtual camera follows the real camera, and C0 & C1 smoothness are achieved.

At a second stage of the multi-stage training process, C0 & C1 smooth losses and an undefined region loss may be optimized. In an absence of the second stage, an image loss may increase substantially. Generally, in the second stage, the angle loss from the first stage is replaced with the undefined region loss. At the second stage, the DNN is trained so that instead of following the real camera pose all the time, the virtual camera follows the real camera sometimes. However, if the undefined regions grow in size, then the virtual camera is trained to follow the real camera more closely. Also, for example, C0 & C1 smoothness are achieved. This stage allows the DNN to learn to stabilize an input video frame if the camera is shaking (e.g., from an unintended hand movement of a user holding the camera).

At a third stage of the multi-stage training process, C0 & C1 smooth losses and an undefined region loss may be optimized, along with an image loss. Generally, an image loss is added to the second stage of the training. By adding the image loss function, a camera is trained to distinguish an outdoor scene (e.g., far away objects) from an indoor scene (e.g., with bounded distances).

IV. Training Machine Learning Models for Generating Inferences/Predictions

Figure 6:
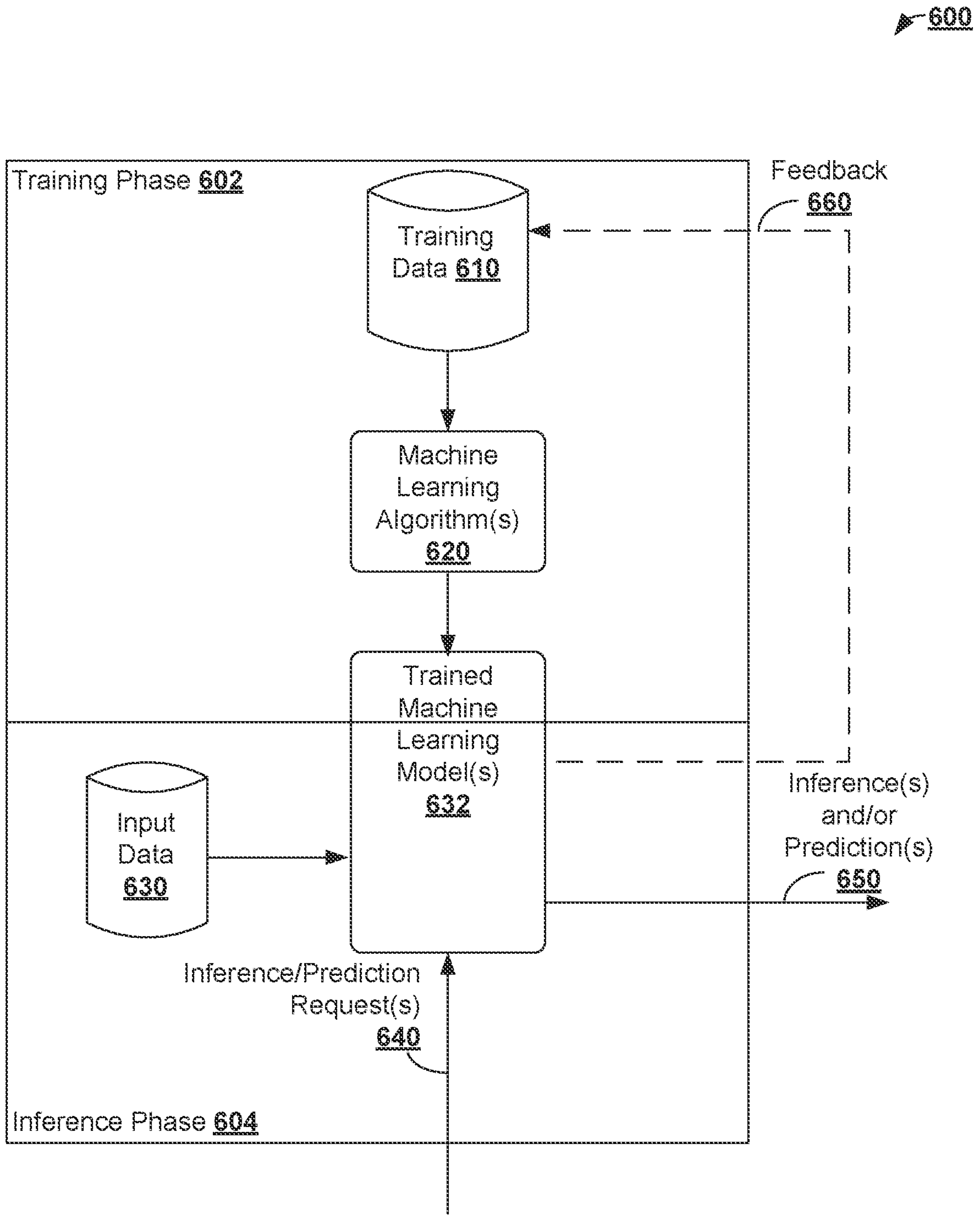
FIG. 6 is a diagram illustrating training and inference phases of a machine learning model, in accordance with example embodiments.

FIG. 6 shows diagram 600 illustrating a training phase 602 and an inference phase 604 of trained machine learning model(s) 632, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 6 shows training phase 602 where one or more machine learning algorithms 620 are being trained on training data 610 to become trained machine learning model 632. Then, during inference phase 604, trained machine learning model 632 can receive input data 630 and one or more inference/prediction requests 640 (perhaps as part of input data 630) and responsively provide as an output one or more inferences and/or predictions 650.

As such, trained machine learning model(s) 632 can include one or more models of one or more machine learning algorithms 620. Machine learning algorithm(s) 620 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 620 may be supervised or unsupervised, and may implement any suitable combination of online and offline learning.

In some examples, machine learning algorithm(s) 620 and/or trained machine learning model(s) 632 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 620 and/or trained machine learning model(s) 632. In some examples, trained machine learning model(s) 632 can be trained, reside and execute to provide inferences on a particular computing device, and/or otherwise can make inferences for the particular computing device.

During training phase 602, machine learning algorithm(s) 620 can be trained by providing at least training data 610 as training input using unsupervised, supervised, semi-supervised, and/or reinforcement learning techniques. Unsupervised learning involves providing a portion (or all) of training data 610 to machine learning algorithm(s) 620 and machine learning algorithm(s) 620 determining one or more output inferences based on the provided portion (or all) of training data 610. Supervised learning involves providing a portion of training data 610 to machine learning algorithm(s) 620, with machine learning algorithm(s) 620 determining one or more output inferences based on the provided portion of training data 610, and the output inference(s) are either accepted or corrected based on correct results associated with training data 610. In some examples, supervised learning of machine learning algorithm(s) 620 can be governed by a set of rules and/or a set of labels for the training input, and the set of rules and/or set of labels may be used to correct inferences of machine learning algorithm(s) 620.

Semi-supervised learning involves having correct results for part, but not all, of training data 610. During semi-supervised learning, supervised learning is used for a portion of training data 610 having correct results, and unsupervised learning is used for a portion of training data 610 not having correct results. Reinforcement learning involves machine learning algorithm(s) 620 receiving a reward signal regarding a prior inference, where the reward signal can be a numerical value. During reinforcement learning, machine learning algorithm(s) 620 can output an inference and receive a reward signal in response, where machine learning algorithm(s) 620 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 620 and/or trained machine learning model(s) 632 can be trained using other machine learning techniques, including but not limited to, incremental learning and curriculum learning.

In some examples, machine learning algorithm(s) 620 and/or trained machine learning model(s) 632 can use transfer learning techniques. For example, transfer learning techniques can involve trained machine learning model(s) 632 being pre-trained on one set of data and additionally trained using training data 610. More particularly, machine learning algorithm(s) 620 can be pre-trained on data from one or more computing devices and a resulting trained machine learning model provided to computing device CD1, where CD1 is intended to execute the trained machine learning model during inference phase 604. Then, during training phase 602, the pre-trained machine learning model can be additionally trained using training data 610, where training data 610 can be derived from kernel and non-kernel data of computing device CD1. This further training of the machine learning algorithm(s) 620 and/or the pre-trained machine learning model using training data 610 of CD1 's data can be performed using either supervised or unsupervised learning. Once machine learning algorithm(s) 620 and/or the pre-trained machine learning model has been trained on at least training data 610, training phase 602 can be completed. The trained resulting machine learning model can be utilized as at least one of trained machine learning model(s) 632.

In particular, once training phase 602 has been completed, trained machine learning model(s) 632 can be provided to a computing device, if not already on the computing device. Inference phase 604 can begin after trained machine learning model(s) 632 are provided to computing device CD1.

During inference phase 604, trained machine learning model(s) 632 can receive input data 630 and generate and output one or more corresponding inferences and/or predictions 650 about input data 630. As such, input data 630 can be used as an input to trained machine learning model(s) 632 for providing corresponding inference(s) and/or prediction (s) 650 to kernel components and non-kernel components. For example, trained machine learning model(s) 632 can generate inference(s) and/or prediction(s) 650 in response to one or more inference/prediction requests 640. In some examples, trained machine learning model(s) 632 can be executed by a portion of other software. For example, trained machine learning model(s) 632 can be executed by an inference or prediction daemon to be readily available to provide inferences and/or predictions upon request. Input data 630 can include data from computing device CD1 executing trained machine learning model(s) 632 and/or input data from one or more computing devices other than CD1.

Input data 630 can include a collection of video frames provided by one or more sources. The collection of video frames can include videos of an object under different movement conditions, such as a camera shake, a motion blur, a rolling shutter, a panning video, videos taken during walking, running, or while traveling in a vehicle. Also, for example, the collection of video frames can include videos of indoor and outdoor scenes. Other types of input data are possible as well.

Inference(s) and/or prediction(s) 650 can include output images, output rotations for a virtual camera, output lens offsets for the virtual camera, and/or other output data produced by trained machine learning model(s) 632 operating on input data 630 (and training data 610). In some examples, trained machine learning model(s) 632 can use output inference(s) and/or prediction(s) 650 as input feedback 660. Trained machine learning model(s) 632 can also rely on past inferences as inputs for generating new inferences.

Convolutional neural networks 220, 320 and so forth can be examples of machine learning algorithm(s) 620. After training, the trained version of convolutional neural networks 220, 320 and so forth can be examples of trained machine learning model(s) 632. In this approach, an example of inference/prediction request(s) 640 can be a request to stabilize an input video and a corresponding example of inferences and/or prediction(s) 650 can be an output stabilized video.

In some examples, one computing device CD_SOLO can include the trained version of convolutional neural network 100, perhaps after training convolutional neural network 100. Then, computing device CD_SOLO can receive requests to stabilize an input video, and use the trained version of convolutional neural network 100 to generate the stabilized video.

In some examples, two or more computing devices CD_CL1 and CD_SRV can be used to provide output images; e.g., a first computing device CD_CL1 can generate and send requests to stabilize an input video to a second computing device CD_SRV. Then, CD_SRV can use the trained version of convolutional neural network 100, perhaps after training convolutional neural network 100, to generate the stabilized video, and respond to the request from CD_CL1 for the stabilized video. Then, upon reception of responses to the requests, CD_CL1 can provide the requested stabilized video (e.g., using a user interface and/or a display).

V. Example Data Network

Figure 7:
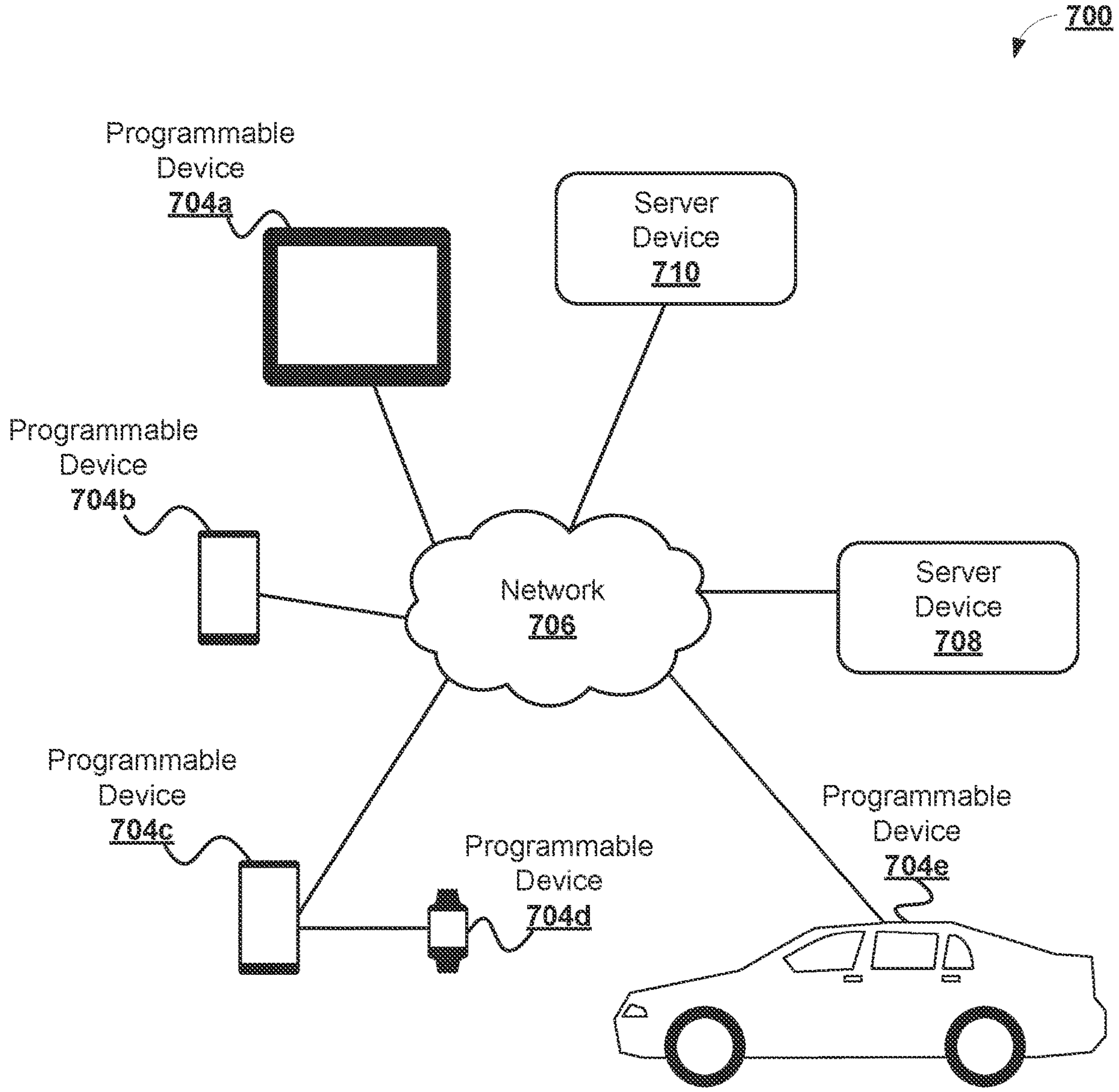
FIG. 7 depicts a distributed computing architecture, in accordance with example embodiments.

FIG. 7 depicts a distributed computing architecture 700, in accordance with example embodiments. Distributed computing architecture 700 includes server devices 708, 710 that are configured to communicate, via network 706, with programmable devices 704*a*, 704*b*, 704*c*, 704*d*, 704*e*. Network 706 may correspond to a local area network (LAN), a wide area network (WAN), a WLAN, a WWAN, a corporate intranet, the public Internet, or any other type of network configured to provide a communications path between networked computing devices. Network 706 may also correspond to a combination of one or more LANs, WANs, corporate intranets, and/or the public Internet.

Although FIG. 7 only shows five programmable devices, distributed application architectures may serve tens, hundreds, or thousands of programmable devices. Moreover, programmable devices 704*a*, 704*b*, 704*c*, 704*d*, 704*e* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 704*a*, 704*b*, 704*c*, 704*e*, programmable devices can be directly connected to network 706. In other examples, such as illustrated by programmable device 704*d*, programmable devices can be indirectly connected to network 706 via an associated computing device, such as programmable device 704*c*. In this example, programmable device 704*c* can act as an associated computing device to pass electronic communications between programmable device 704*d* and network 706. In other examples, such as illustrated by programmable device 704*e*, a computing device can be part of and/or inside a vehicle, such as a car, a truck, a bus, a boat or ship, an airplane, etc. In other examples not shown in FIG. 7, a programmable device can be both directly and indirectly connected to network 706.

Server devices 708, 710 can be configured to perform one or more services, as requested by programmable devices 704*a*-704*e*. For example, server device 708 and/or 710 can provide content to programmable devices 704*a*-704*e*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 708 and/or 710 can provide programmable devices 704*a*-704*e* with access to software for database, search, computation, graphical, audio, video, World Wide Web/Internet utilization, and/or other functions. Many other examples of server devices are possible as well.

VI. Computing Device Architecture

Figure 8:
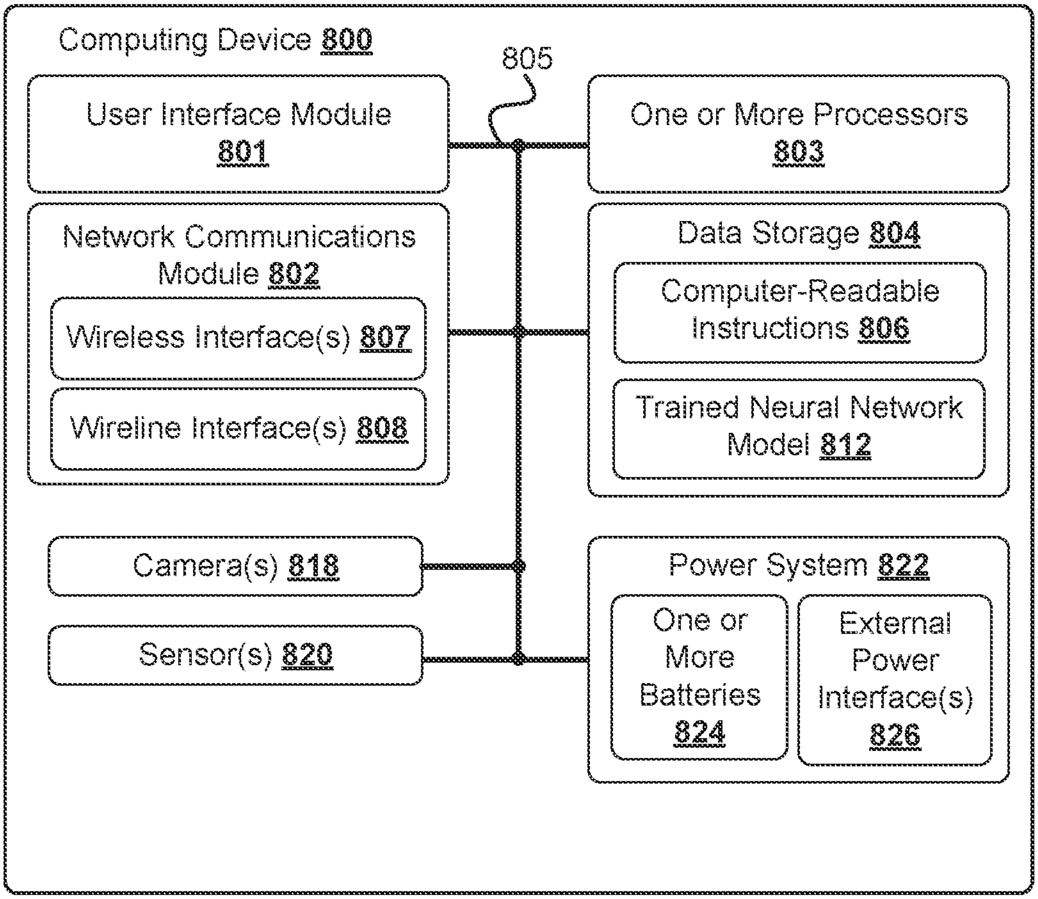
FIG. 8 is a block diagram of a computing device, in accordance with example embodiments.

FIG. 8 is a block diagram of an example computing device 800, in accordance with example embodiments. In particular, computing device 800 shown in FIG. 8 can be configured to perform at least one function of and/or related to a convolutional neural network as disclosed herein, and/or method 1000.

Computing device 800 may include a user interface module 801, a network communications module 802, one or more processors 803, data storage 804, one or more cameras 818, one or more sensors 820, and power system 822, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a touch screen, a computer mouse, a keyboard, a keypad, a touch pad, a trackball, a joystick, a voice recognition module, and/or other similar devices. User interface module 801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 801 can also be configured to generate audible outputs, with devices such as a speaker, speaker jack, audio output port, audio output device, earphones, and/or other similar devices. User interface module 801 can further be configured with one or more haptic devices that can generate haptic outputs, such as vibrations and/or other outputs detectable by touch and/or physical contact with computing device 800. In some examples, user interface module 801 can be used to provide a graphical user interface (GUI) for utilizing computing device 800, such as, for example, a graphical user interface illustrated in FIG. 15.

Network communications module 802 can include one or more devices that provide one or more wireless interfaces 807 and/or one or more wireline interfaces 808 that are configurable to communicate via a network. Wireless interface(s) 807 can include one or more wireless transmitters, receivers, and/or transceivers, such as a Bluetooth™ transceiver, a Zigbee® D transceiver, a Wi-Fi™ transceiver, a WiMAX™ transceiver, an LTE™ transceiver, and/or other type of wireless transceiver configurable to communicate via a wireless network. Wireline interface(s) 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 802 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 803 can include one or more general purpose processors, and/or one or more special purpose processors (e.g., digital signal processors, tensor processing units (TPUs), graphics processing units (GPUs), application specific integrated circuits, etc.). One or more processors 803 can be configured to execute computer-readable instructions 806 that are contained in data storage 804 and/or other instructions as described herein.

Data storage 804 can include one or more non-transitory computer-readable storage media that can be read and/or accessed by at least one of one or more processors 803. The one or more computer-readable storage media can include volatile and/or non-volatile storage components, such as optical, magnetic, organic or other memory or disc storage, which can be integrated in whole or in part with at least one of one or more processors 803. In some examples, data storage 804 can be implemented using a single physical device (e.g., one optical, magnetic, organic or other memory or disc storage unit), while in other examples, data storage 804 can be implemented using two or more physical devices.

Data storage 804 can include computer-readable instructions 806 and perhaps additional data. In some examples, data storage 804 can include storage required to perform at least part of the herein-described methods, scenarios, and techniques and/or at least part of the functionality of the herein-described devices and networks. In some examples, data storage 804 can include storage for a trained neural network model 812 (e.g., a model of trained convolutional neural networks). In particular of these examples, computer-readable instructions 806 can include instructions that, when executed by processor(s) 803, enable computing device 800 to provide for some or all of the functionality of trained neural network model 812.

In some examples, computing device 800 can include one or more cameras 818. Camera(s) 818 can include one or more image capture devices, such as still and/or video cameras, equipped to capture light and record the captured light in one or more images; that is, camera(s) 818 can generate image(s) of captured light. The one or more images can be one or more still images and/or one or more images utilized in video imagery. Camera(s) 818 can capture light and/or electromagnetic radiation emitted as visible light, infrared radiation, ultraviolet light, and/or as one or more other frequencies of light.

In some examples, computing device 800 can include one or more sensors 820. Sensors 820 can be configured to measure conditions within computing device 800 and/or conditions in an environment of computing device 800 and provide data about these conditions. For example, sensors 820 can include one or more of: (i) sensors for obtaining data about computing device 800, such as, but not limited to, a thermometer for measuring a temperature of computing device 800, a battery sensor for measuring power of one or more batteries of power system 822, and/or other sensors measuring conditions of computing device 800; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 800, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 800, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 800, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 820 are possible as well.

Power system 822 can include one or more batteries 824 and/or one or more external power interfaces 826 for providing electrical power to computing device 800. Each battery of the one or more batteries 824 can, when electrically coupled to the computing device 800, act as a source of stored electrical power for computing device 800. One or more batteries 824 of power system 822 can be configured to be portable. Some or all of one or more batteries 824 can be readily removable from computing device 800. In other examples, some or all of one or more batteries 824 can be internal to computing device 800, and so may not be readily removable from computing device 800. Some or all of one or more batteries 824 can be rechargeable. For example, a rechargeable battery can be recharged via a wired connection between the battery and another power supply, such as by one or more power supplies that are external to computing device 800 and connected to computing device 800 via the one or more external power interfaces. In other examples, some or all of one or more batteries 824 can be non-rechargeable batteries.

One or more external power interfaces 826 of power system 822 can include one or more wired-power interfaces, such as a USB cable and/or a power cord, that enable wired electrical power connections to one or more power supplies that are external to computing device 800. One or more external power interfaces 826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 826, computing device 800 can draw electrical power from the external power source the established electrical power connection. In some examples, power system 822 can include related sensors, such as battery sensors associated with the one or more batteries or other types of electrical power sensors.

VII. Cloud-Based Servers

Figure 9:
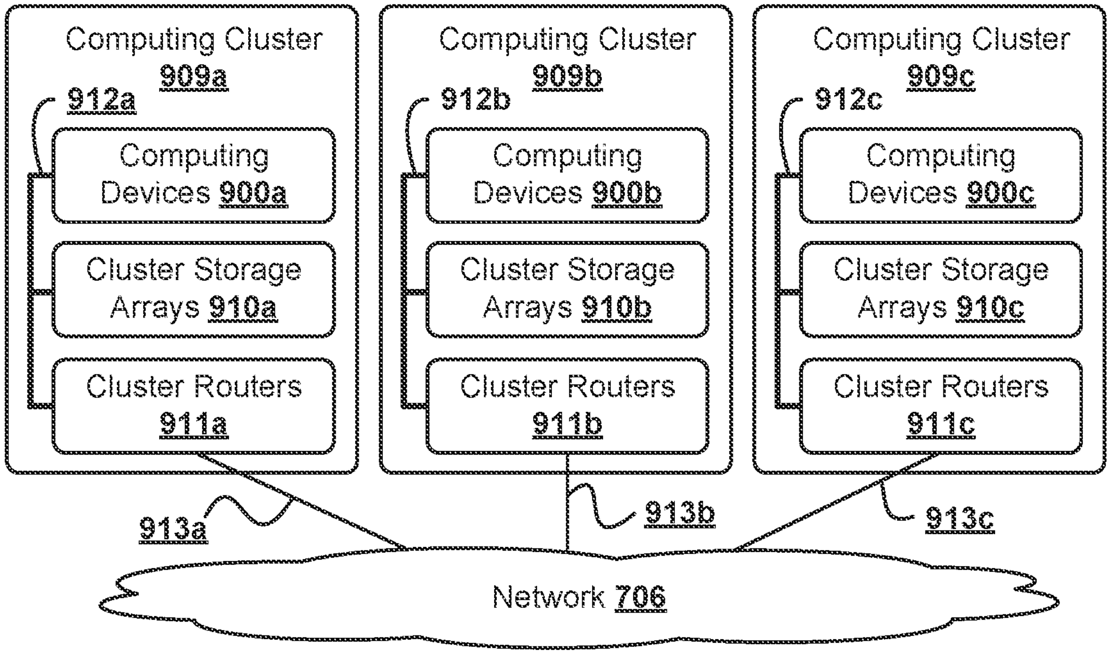
FIG. 9 depicts a network of computing clusters arranged as a cloud-based server system, in accordance with example embodiments.

FIG. 9 depicts a cloud-based server system in accordance with an example embodiment. In FIG. 9, functionality of convolutional neural networks, and/or a computing device can be distributed among computing clusters 909*a*, 909*b*, 909*c*. Computing cluster 909*a* can include one or more computing devices 900*a*, cluster storage arrays 910*a*, and cluster routers 911*a* connected by a local cluster network 912*a*. Similarly, computing cluster 909*b* can include one or more computing devices 900*b*, cluster storage arrays 910*b*, and cluster routers 911*b* connected by a local cluster network 912*b*. Likewise, computing cluster 909*c* can include one or more computing devices 900*c*, cluster storage arrays 910*c*, and cluster routers 911*c* connected by a local cluster network 912*c*.

In some embodiments, each of computing clusters 909*a*, 909*b*, and 909*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 909*a*, for example, computing devices 900*a* can be configured to perform various computing tasks of convolutional neural network, confidence learning, and/or a computing device. In one embodiment, the various functionalities of a convolutional neural network, confidence learning, and/or a computing device can be distributed among one or more of computing devices 900*a*, 900*b*, 900*c*. Computing devices 900*b* and 900*c* in respective computing clusters 909*b* and 909*c* can be configured similarly to computing devices 900*a* in computing cluster 909*a*. On the other hand, in some embodiments, computing devices 900*a*, 900*b*, and 900*c* can be configured to perform different functions.

In some embodiments, computing tasks and stored data associated with a convolutional neural networks, and/or a computing device can be distributed across computing devices 900*a*, 900*b*, and 900*c* based at least in part on the processing requirements of a convolutional neural networks, and/or a computing device, the processing capabilities of computing devices 900*a*, 900*b*, 900*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 910*a*, 910*b*, 910*c* of computing clusters 909*a*, 909*b*, 909*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of convolutional neural networks, and/or a computing device can be distributed across computing devices 900*a*, 900*b*, 900*c* of computing clusters 909*a*, 909*b*, 909*c*, various active portions and/or backup portions of these components can be distributed across cluster storage arrays 910*a*, 910*b*, 910*c*. For example, some cluster storage arrays can be configured to store one portion of the data of a convolutional neural network, and/or a computing device, while other cluster storage arrays can store other portion(s) of data of a convolutional neural network, and/or a computing device. Also, for example, some cluster storage arrays can be configured to store the data of a first convolutional neural network, while other cluster storage arrays can store the data of a second and/or third convolutional neural network. Additionally, some cluster storage arrays can be configured to store backup versions of data stored in other cluster storage arrays.

Cluster routers 911*a*, 911*b*, 911 *c* in computing clusters 909*a*, 909*b*, 909*c* can include networking equipment configured to provide internal and external communications for the computing clusters. For example, cluster routers 911*a* in computing cluster 909*a* can include one or more internet switching and routing devices configured to provide (i) local area network communications between computing devices 900*a* and cluster storage arrays 910*a* via local cluster network 912*a*, and (ii) wide area network communications between computing cluster 909*a* and computing clusters 909*b* and 909*c* via wide area network link 913*a* to network 706. Cluster routers 911*b* and 911*c* can include network equipment similar to cluster routers 911*a*, and cluster routers 911*b* and 911*c* can perform similar networking functions for computing clusters 909*b* and 909*b* that cluster routers 911*a* perform for computing cluster 909*a*.

In some embodiments, the configuration of cluster routers 911*a*, 911*b*, 911*c* can be based at least in part on the data communication requirements of the computing devices and cluster storage arrays, the data communications capabilities of the network equipment in cluster routers 911*a*, 911*b*, 911*c*, the latency and throughput of local cluster networks 912*a*, 912*b*, 912*c*, the latency, throughput, and cost of wide area network links 913*a*, 913*b*, 913*c*, and/or other factors that can contribute to the cost, speed, fault-tolerance, resiliency, efficiency and/or other design criteria of the moderation system architecture.

VI. Example Methods of Operation

Figure 10:
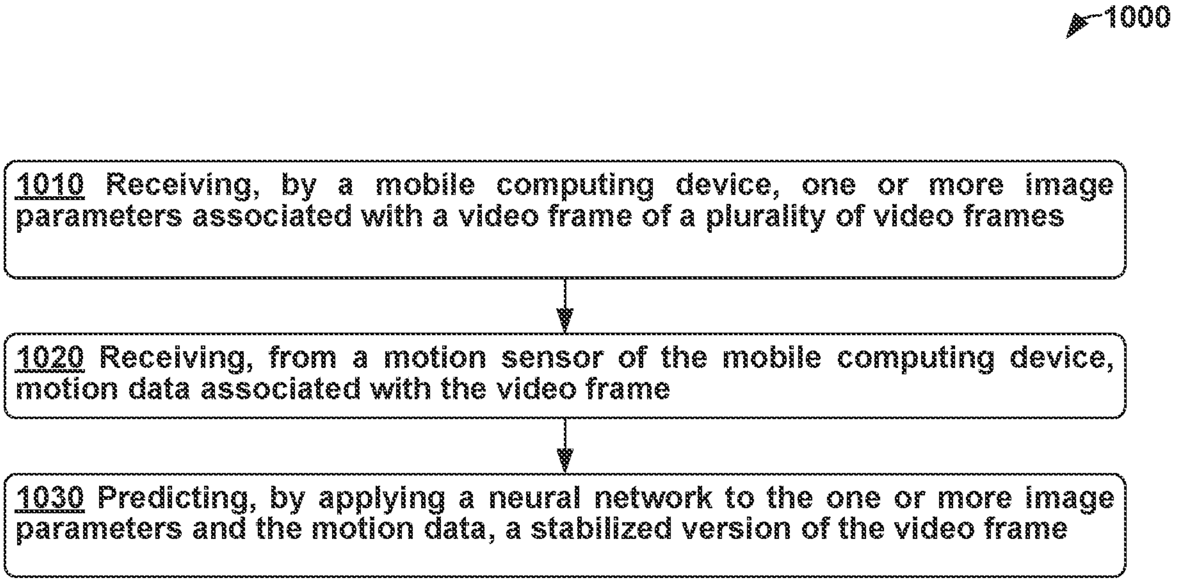
FIG. 10 is a flowchart of a method, in accordance with example embodiments.

FIG. 10 illustrates a method 1000, in accordance with example embodiments. Method 1000 may include various blocks or steps. The blocks or steps may be carried out individually or in combination. The blocks or steps may be carried out in any order and/or in series or in parallel. Further, blocks or steps may be omitted or added to method 1000.

The blocks of method 1000 may be carried out by various elements of computing device 800 as illustrated and described in reference to FIG. 8.

Block 1010 includes receiving, by a mobile computing device, one or more image parameters associated with a video frame of a plurality of video frames.

Block 1020 includes receiving, from a motion sensor of the mobile computing device, motion data associated with the video frame.

Block 1030 includes predicting, by applying a neural network to the one or more image parameters and the motion data, a stabilized version of the video frame.

In some embodiments, the neural network may include an encoder and a decoder, and applying the neural network may include: applying the encoder to the one or more image parameters to generate a latent space representation; adjusting the latent space representation based on the motion data; and applying the decoder to the latent space representation as adjusted to output the stabilized version.

Some embodiments include generating, from the motion data, a real camera pose associated with the video frame. The latent space representation may be based on the real camera pose.

In some embodiments, the decoder may include a long short-term memory (LSTM) component, and applying the decoder may include applying the LSTM component to predict a virtual camera pose.

In some embodiments, the decoder may include a warping grid, and applying the decoder further may include applying the warping grid to the predicted virtual camera pose to output the stabilized version.

Some embodiments include determining a history of real camera poses and a history of virtual camera poses. The latent space representation may be based on the history of the real camera poses and the history of the virtual camera poses.

In some embodiments, the motion data includes rotation data and timestamp data. Such embodiments may include determining, from the rotation data and the timestamp data, a relative rotation of a camera pose in the video frame relative to a reference camera pose in a reference video frame. The predicting of the stabilized version may be based on the relative rotation.

In some embodiments, applying the encoder may include generating, from a pair of successive video frames of the plurality of video frames, an optical flow indicative of a correspondence between the pair of successive video frames. The method may further include generating the latent space representation based on the optical flow.

Some embodiments include training the neural network to receive a particular video frame and output, based on one or more image parameters and motion data associated with the particular video frame, a stabilized version of the particular video frame.

In some embodiments, training of the neural network may include adjusting, for the particular video frame, a difference between a real camera pose and a virtual camera pose.

In some embodiments, training of the neural network may include adjusting, for the particular video frame, a first order difference between a real camera pose and a virtual camera pose.

In some embodiments, training of the neural network may include adjusting, for the particular video frame, an angular difference between a real camera pose and a virtual camera pose. In some embodiments, adjusting of the angular difference includes, upon a determination that the angular difference exceeds a threshold angle, reducing the angular difference between the real camera pose and the virtual camera pose.

In some embodiments, training of the neural network may include adjusting, for the particular video frame, an area of a distorted region indicative of an undesired motion of the mobile computing device. In some embodiments, adjusting the area of the distorted region includes determining areas of distorted regions in one or more video frames that appear after the particular video frame. The method further includes applying weights to the areas of the distorted regions. The weights as applied may be configured to decrease with distance of a video frame, of the one or more video frames, from the particular video frame.

In some embodiments, training of the neural network may include adjusting, for the particular video frame, an image loss.

In some embodiments, the one or more image parameters may include optical image stabilization (OIS) data indicative of a lens position. Applying the neural network includes predicting a lens offset for a virtual camera based on the lens position.

In some embodiments, predicting the stabilized version of the video frame includes obtaining the trained neural network at the mobile computing device. The method further includes applying the trained neural network as obtained to the predicting of the stabilized version.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method, comprising:

receiving, by a mobile computing device, one or more image parameters associated with a video frame of a plurality of video frames;

receiving, from a motion sensor of the mobile computing device, motion data associated with the video frame, wherein the motion data is different from the one or more image parameters; and predicting, by applying a neural network to the one or more image parameters and the motion data, a stabilized version of the video frame, wherein the stabilized version removes image degradations caused by a camera shake of the mobile computing device, wherein the neural network comprises an encoder and a decoder, and wherein applying the neural network comprises:

applying the encoder of the neural network to the one or more image parameters to generate a latent space representation;

adjusting the latent space representation based on the motion data; and applying the decoder of the neural network to the latent space representation as adjusted to output the stabilized version, wherein applying the decoder to the latent space representation comprises:

predicting a virtual camera pose for the video frame; and mapping pixels of the video frame from a real camera domain to a virtual camera domain to generate the stabilized version of the video frame, wherein the mapping is performed using a real-to-virtual projection matrix determined based on the predicted virtual camera pose and a real camera pose.

2. The computer-implemented method of claim 1, further comprising:

generating, from the motion data, the real camera pose associated with the video frame, and wherein the latent space representation is based on the real camera pose.

3. The computer-implemented method of claim 1, wherein the decoder comprises a long short-term memory (LSTM) component, and wherein the predicting of the virtual camera pose further comprises applying the LSTM component to predict the virtual camera pose.

4. The computer-implemented method of claim 1, wherein the decoder comprises a warping grid, and wherein applying the decoder further comprises applying the warping grid to the predicted virtual camera pose to output the stabilized version.

5. The computer-implemented method of claim 1, further comprising:

determining a first history of real camera poses and a second history of virtual camera poses, and wherein the latent space representation is based on the first history of the real camera poses and the second history of the virtual camera poses.

6. The computer-implemented method of claim 1, wherein the motion data comprises rotation data and timestamp data, and the method further comprising:

determining, from the rotation data and the timestamp data, a relative rotation of a camera pose in the video frame relative to a reference camera pose in a reference video frame, and wherein the predicting of the stabilized version is based on the relative rotation.

7. The computer-implemented method of claim 1, wherein applying the encoder further comprises:

generating, from a pair of successive video frames of the plurality of video frames, an optical flow indicative of a correspondence between the pair of successive video frames; and generating the latent space representation based on the optical flow.

8. The computer-implemented method of claim 1, further comprising:

training the neural network to receive a particular video frame and output, based on one or more image parameters and motion data associated with the particular video frame, a stabilized version of the particular video frame.

9. The computer-implemented method of claim 8, wherein the training of the neural network further comprises adjusting, for the particular video frame, a difference between virtual camera poses for successive video frames.

10. The computer-implemented method of claim 8, wherein the training of the neural network further comprises adjusting, for the particular video frame, a first order difference between virtual camera poses for successive video frames.

11. The computer-implemented method of claim 8, wherein the training of the neural network further comprises adjusting, for the particular video frame, an angular difference between the real camera pose and the virtual camera pose.

12. The computer-implemented method of claim 11, wherein the adjusting of the angular difference further comprises:

upon a determination that the angular difference exceeds a threshold angle, reducing the angular difference between the real camera pose and the virtual camera pose.

13. The computer-implemented method of claim 8, wherein the training of the neural network further comprises adjusting, for the particular video frame, an area of a distorted region indicative of an undesired motion of the mobile computing device.

14. The computer-implemented method of claim 13, wherein the adjusting of the area of the distorted region comprises:

determining areas of distorted regions in one or more video frames that appear after the particular video frame; and applying weights to the areas of the distorted regions, wherein the weights as applied are configured to decrease with distance of a video frame, of the one or more video frames, from the particular video frame.

15. The computer-implemented method of claim 8, wherein the training of the neural network further comprises adjusting, for the particular video frame, an image loss.

16. The computer-implemented method of claim 1, wherein the one or more image parameters comprise optical image stabilization (OIS) data indicative of a lens position, and wherein the applying of the neural network comprises predicting a lens offset for a virtual camera based on the lens position.

17. The computer-implemented method of claim 1, wherein predicting the stabilized version of the video frame comprises:

obtaining the trained neural network at the mobile computing device; and applying the trained neural network as obtained to the predicting of the stabilized version.

18. The method of claim 1, wherein the image degradations caused by a camera shake comprise one or more of a motion blur, a rolling shutter, image degradations caused by an unintentional shaking of a user's hand, or image degradations caused by a panning video.

19. A computing device, comprising:

one or more processors; and data storage, wherein the data storage has stored thereon computer-executable instructions that, when executed by the one or more processors, cause the computing device to carry out functions comprising:

receiving, by the computing device, one or more image parameters associated with a video frame of a plurality of video frames;

receiving, from a motion sensor of the computing device, motion data associated with the video frame, wherein the motion data is different from the one or more image parameters; and predicting, by applying a neural network to the one or more image parameters and the motion data, a stabilized version of the video frame, wherein the stabilized version removes image degradations caused by a camera shake of the computing device, wherein the neural network comprises an encoder and a decoder, and wherein applying the neural network comprises:

applying the encoder of the neural network to the one or more image parameters to generate a latent space representation;

adjusting the latent space representation based on the motion data; and applying the decoder of the neural network to the latent space representation as adjusted to output the stabilized version, wherein applying the decoder to the latent space representation comprises:

predicting a virtual camera pose for the video frame; and mapping pixels of the video frame from a real camera domain to a virtual camera domain to generate the stabilized version of the video frame, wherein the mapping is performed using a real-to-virtual projection matrix determined based on the predicted virtual camera pose and a real camera pose.

20. An article of manufacture comprising one or more non-transitory computer readable media having computer-readable instructions stored thereon that, when executed by one or more processors of a computing device, cause the computing device to carry out functions comprising:

receiving, by the computing device, one or more image parameters associated with a video frame of a plurality of video frames;

receiving, from a motion sensor of the computing device, motion data associated with the video frame, wherein the motion data is different from the one or more image parameters; and predicting, by applying a neural network to the one or more image parameters and the motion data, a stabilized version of the video frame, wherein the stabilized version removes image degradations caused by a camera shake of the computing device, wherein the neural network comprises an encoder and a decoder, and wherein applying the neural network comprises:

applying the encoder of the neural network to the one or more image parameters to generate a latent space representation;

adjusting the latent space representation based on the motion data; and applying the decoder of the neural network to the latent space representation as adjusted to output the stabilized version, wherein applying the decoder to the latent space representation comprises:

predicting a virtual camera pose for the video frame; and mapping pixels of the video frame from a real camera domain to a virtual camera domain to generate the stabilized version of the video frame, wherein the mapping is performed using a real-to-virtual projection matrix determined based on the predicted virtual camera pose and a real camera pose.

* * * * *